US007366191B2

(12) United States Patent  
Higashiyama

(10) Patent No.: US 7,366,191 B2  
(45) Date of Patent: Apr. 29, 2008

(54) MESH NETWORK BRIDGES MAKING OPERABLE SPANNING TREE PROTOCOL AND LINE FAULT BACKUP PROTOCOL IN OPTIMIZED FORWARDING ENVIRONMENT

(75) Inventor: Mitsuru Higashiyama, Atsugi (JP)

(73) Assignee: Anritsu Corporation, Atsugi-shi (JP)

( * ) Notice: Subject to any disclaimer, the term of this patent is extended or adjusted under 35 U.S.C. 154(b) by 837 days.

(21) Appl. No.: 10/732,507

(22) Filed: Dec. 9, 2003

(65) Prior Publication Data

US 2004/0190454 A1 Sep. 30, 2004

(30) Foreign Application Priority Data

Dec. 19, 2002 (JP) ............................. 2002-369070

(51) Int. Cl.
*H04L 12/28* (2006.01)

(52) U.S. Cl. ..................................................... 370/406

(58) Field of Classification Search ...................... None
See application file for complete search history.

(56) References Cited

U.S. PATENT DOCUMENTS

| 5,138,615 | A | * | 8/1992 | Lamport et al. | ............. | 370/400 |
| 6,246,689 | B1 | * | 6/2001 | Shavitt | ........................ | 370/406 |
| 2002/0009092 | A1 | * | 1/2002 | Seaman et al. | ............. | 370/406 |

FOREIGN PATENT DOCUMENTS

| JP | 06-062011 A | 3/1994 |
| JP | 06-120949 A | 4/1994 |
| JP | 2001-186182 A | 7/2001 |
| JP | 2003-218901 | 7/2003 |

OTHER PUBLICATIONS

Moy, J. RFC 2328 "OSPF Version 2" Apr. 1998, sections 7.4, 8.2, 9.5, 11, 16, A.3.2.*
C.Y. Lee et al; Internet Engineering Task Force Internet Draft; Nov. 2002, Ethernet Pseudo-Wire Over L2TPv3 (multipoint support).
J. Lau et al; Network Working Group; Internet Draft; Aug. 2003; Layer Two Tunneling Protocol (Version 3).
M. Christensen et al; Network Working Group; Internet Draft; Aug. 2003; "Considerations for IGMP and MLD Snooping Switches".
IEEE Standard for Information Technology; ANSI/IEEE Std. 802. 1D, 1998 Edition; "Part 3: Media Access Control (MAC) Bridges"; pp. 58-113.
IEEE Standard for Information Technology; IEEE Std. 802.3; 2000 Edition; "Part 3: Carrier Sense Multiple Access with Collision Detection (CSMA/CD) Access Method and Physical Layer Specifications".

* cited by examiner

*Primary Examiner*—Doris H. To
*Assistant Examiner*—Kerri M. Rose
(74) *Attorney, Agent, or Firm*—Frishauf, Holtz, Goodman & Chick, P.C.

(57) ABSTRACT

A plurality of mesh-connecting ports interconnect a plurality of bridges including an own bridge and other bridges as a mesh network. A packet transmitter/receiver reciprocally transmits and receives packets between the plurality of bridges through the mesh-connecting ports. A shortest path constructing unit constructs the shortest path between the bridges through the packet transmitter/receiver. An STP processing unit executes STP processing for activating a spanning tree protocol (STP) to provide redundancy to the mesh network. A backup processing unit continuously leaves in the mesh domain a first mesh network bridge detected a line fault, and executes the backup processing to active a back up protocol for forming a backup route in such a manner that the packet reaches a second mesh network bridge that has become unreachable by the line fault, through a third mesh bridge connected with the second mesh network bridge.

25 Claims, 20 Drawing Sheets

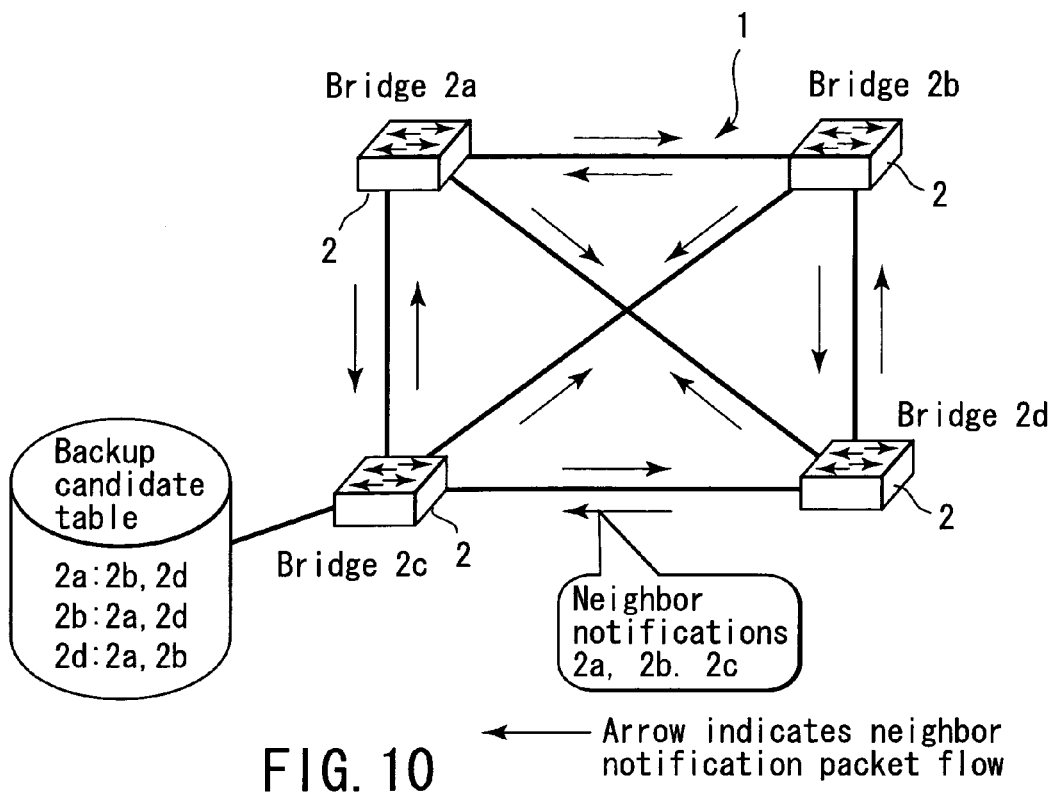
FIG. 10 ← Arrow indicates neighbor notification packet flow
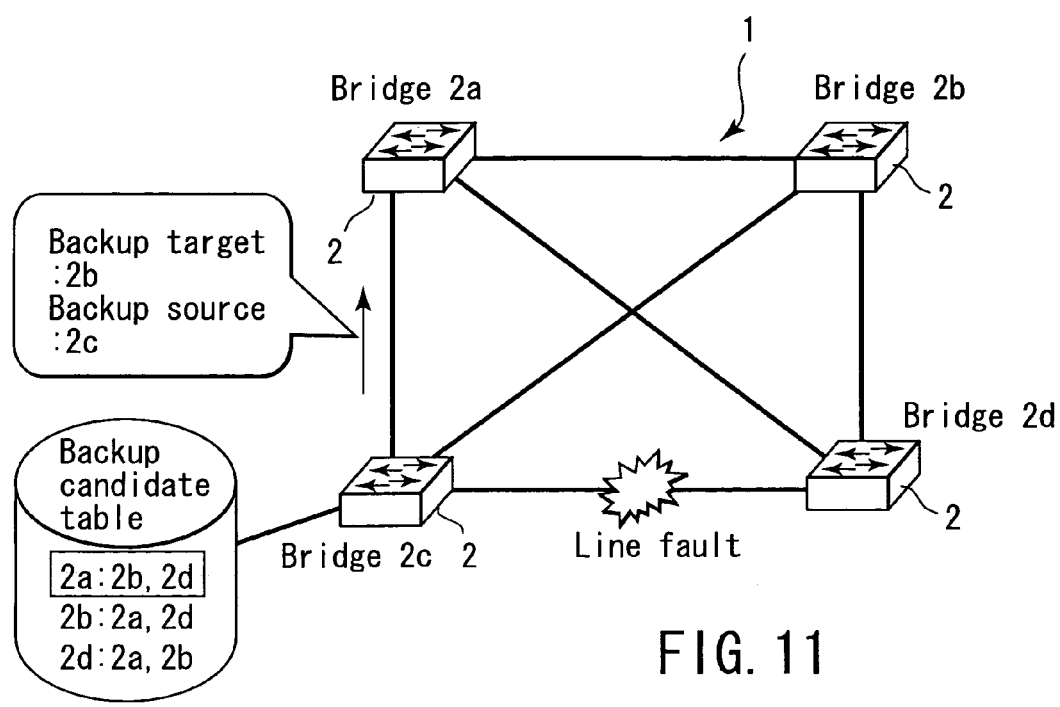
FIG. 11

Backup candidate table

| Connecting port | Neighboring bridge | Backup candidate | Remaining time |
|---|---|---|---|
| 1 | 00:00:91:00:00:01 | 00:00:91:00:00:02<br>00:00:91:00:00:03<br>00:00:91:00:00:04 | 9 |
| 2 | 00:00:91:00:00:02 | 00:00:91:00:00:01<br>00:00:91:00:00:03<br>00:00:91:00:00:04 | 8 |
| 3 | 00:00:91:00:00:03 | 00:00:91:00:00:01<br>00:00:91:00:00:02<br>00:00:91:00:00:04 | 10 |
| 4 | 00:00:91:00:00:04 | 00:00:91:00:00:01<br>00:00:91:00:00:02<br>00:00:91:00:00:03 | 7 |

FIG. 12

Backup receiving table

| Connecting port | Neighboring bridge | Backup candidate | Remaining time |
|---|---|---|---|
| 1 | 00:00:91:00:00:02 | 00:00:91:00:00:01 | 9 |
| 2 | | | 0 |
| 3 | 00:00:91:00:00:02 | 00:00:91:00:00:03 | 10 |
| 4 | | | |

FIG. 13

Mesh control packet

| Destination source (01-80-C2-00-00-0B) | 6 bytes |
|---|---|
| Source address | 6 bytes |
| Packet length | 2 bytes |
| LLC DSAP (0X00) | 1 byte |
| LLC SSAP (0X00) | 1 byte |
| LLC control (0X03) | 1 byte |
| Protocol ID (FMN=0X000B) | 2 bytes |
| Protocol version (0X00) | 1 byte |
| Command | 1 byte |
| Option | 0 to 91 bytes |
| Padding | |
| FCS | 4 bytes |

FIG. 14

Neighbor notification option

| Number of neighboring bridges | 1 byte |
|---|---|
| Neighboring bridge 1 | 6 bytes |
| Neighboring bridge 2 | 6 bytes |
| . . . | |
| Neighboring bridge N | 6 bytes |

FIG. 15

Backup request/cancel option

| Backup target | 6 bytes |
|---|---|
| Backup source | 6 bytes |

FIG. 16

Logical port table

| Index | Logical port number | Assigned physical ports |
|---|---|---|
| 0 | 10 | 1, 2, 3 |
| 1 | 11 | 7, 8, 9 |

STP information table

| Port No. | Port status | Information on last-received BPDU |
|---|---|---|
| 1 | | |
| 2 | | |
| 3 | | |
| 4 | listening | Received BPUD3 |
| 5 | learning | Received BPUD4 |
| 6 | forwarding | Received BPUD5 |
| 7 | | |
| 8 | | |
| 9 | | |
| 10 | forwarding | Received BPUD1 |
| 11 | blocking | Received BPUD8 |

Bridges 2a and 2c have two logical ports

MESH NETWORK BRIDGES MAKING OPERABLE SPANNING TREE PROTOCOL AND LINE FAULT BACKUP PROTOCOL IN OPTIMIZED FORWARDING ENVIRONMENT

CROSS-REFERENCE TO RELATED APPLICATIONS

This application is based upon and claims the benefit of priority from the prior Japanese Patent Application No.2002-369070 filed Dec. 19, 2002, the entire contents of which are incorporated herein by reference.

BACKGROUND OF THE INVENTION

1. Field of the Invention

The present invention relates to a mesh network bridge, and in particular to a mesh network bridge connected by line to a mesh network configured of a plurality of bridges interconnected by line, and including the shortest path constructing means such as the optimized forwarding and a plurality of mesh-connecting ports.

2. Description of the Related Art

As one form of network, there is a mesh network including a plurality of bridges interconnected by line.

Among the mesh networks of this kind, a full-mesh network (hereinafter referred to as FMN) including a plurality of bridges all interconnected by line with at least one line between the bridges is well known.

FIG. 23 shows an example of FMN of this kind.

A bridge connected in mesh is called the mesh network bridge.

The network connected in mesh is described as a mesh domain for distinction from the other parts.

Also, the mesh domain connected in full mesh is sometimes described as a FMN domain.

As shown in FIG. 24, each mesh network bridge 32 includes mesh-connecting ports 33 for mesh connection and non-mesh-connecting ports 34.

The mesh-connecting port 33 is used for line connection with other mesh network bridges 32.

The non-mesh-connecting port 34, on the other hand, is connected with nodes 37 and bridges 36 for constructing an external network other than the mesh network bridge 32.

In a network containing a redundant route caused by a plurality of bridges, a spanning tree protocol (STP) is employed for determining a route.

For example, as shown in FIG. 25, assume a network over which LAN 1 and LAN 2 are connected to each other by means of a bridge A.

Here, in the case of a network over which node "n1" such as personal computer is connected to LAN 1, and HUB 1 is connected to LAN 2, packets transmitted from the node "n1" are transmitted to all nodes of a broadcast domain including node "n2" such as personal computer connected to the HUB 1 via LAN 1→bridge A→LAN 2→HUB 1.

Over such network, when HUB 2 is connected to LAN 1 and LAN 2 in parallel to bridge A, a packet transmitted from the node "n1" loops over the network like LAN 1→bridge A→LAN 2→HUB 2→LAN 1→bridge A→LAN 2→HUB 2. As a result, a packet cannot be transmitted from a node other than node "n1" (node in a broadcast domain other than node "n1").

In the case where a network is configured by only bridge A and HUB 1 as shown in FIG. 25, a spanning tree is employed to prevent a packet transmitted from a node from looping over the network.

In addition, as shown in FIG. 26, in the case where two bridges A and B are connected in parallel between LAN 1 to which node "n1" such as personal computer is connected and LAN 2 to which HUB 1 is connected, thereby making communication among nodes "n2", "n3", "n4", . . . such as personal computers connected to node "n1" and HUB 1, one bridge is generally used to make communication. When this bridge A is linked down, the other bridge B is used to make communication, whereby a spanning tree is employed in order to cause a network to provide redundancy.

Here, basic algorithm and protocol of the spanning tree includes the following items (1) to (5) (Refer to ISO/IEC 15802-3: 1998 (E) ANSI/IEEE Std 80 2. 1D, 1998 Edition, Part 3: Media Access Control(MAC) Bridges, pp v-xix, LOCAL AND METROPOLITAN AREA NETWORKS: 8. the Spanning Tree Algorithm and Protocol pp. 58-109 and 9. Encoding of Bridge Protocol Data Units(BPDUs) pp. 110-113).

(1) A special frame called Configuration Bridge Protocol Data Units (hereinafter, referred to as BPDU) is exchanged between bridges.

The following works are performed based on this exchanged BPDU.

(2) A network root bridge is selected.

Only one root bridge exists in the entire LAN bridge connected.

(3) Each bridge computes the shortest route that reaches a root bridge (A port that provides the shortest route to the root bridge is called a root port).

(4) With respect to each LAN, a "designated bridge" is selected from a bridge connected to the LAN.

(5) Each bridge selects a port (designated port) that belongs to a spanning tree and a port (blocked port) that does not belong to such spanning tree.

All data frames received at a blocked port are discarded.

In addition, frame transmission from a blocked port is not performed at all.

A received BPDU is not forwarded at all.

A data portion of the above mentioned BPDU includes at least root ID, bridge ID, root path cost.

Root ID is an ID of a root bridge (or a bridge assumed to be such root bridge), and is generated based on a MAC address of such bridge and a priority designated by an administrator.

Bridge ID is an ID of a bridge that transmits a BPDU, and is generated based on a MAC address of such bridge and a priority designated by an administrator.

A root path cost is a cost of the (possible) shortest route from a bridge that transmits a BPDU to a root bridge.

In an initial state (when a power is supplied), each bridge is a root bridge itself, and it is assumed that a root path cost is 0.

Each bridge transmits the initial value of a BPDU to all ports, and at the same time, receives the BPDU transmitted from another bridge from all the ports.

In the case where a bridge has received a better BPDU from a port, such bridge stops transmission of BPDU to that port, and then, changes the value of the BPDU to be transmitted by the bridge itself.

In this manner, in the case where a spanning tree enters a stable state, only one bridge transmits a BPDU among each LAN.

For example, in the case where BPDU 1 and BPDU 2 are present, it is judged which of the above BPDUs is better in accordance with rules (1) to (4) below. (1) In the case where root ID of BPDU 1 is numerically smaller than that of BPDU 2, it is judged that BPDU 1 is better than BPDU 2.

(2) In the case where root ID of BPDU 1 is numerically equal to that of BPDU 2, if a root path cost of BPDU 1 is smaller than that of BPDU 2, it is judged that BPDU 1 is better than BPDU 2.

(3) In the case where root ID of BPDU 1 is numerically equal to that of BPDU 2, and a root path cost of BPDU 1 is equal to that of BPDU 2, if bridge ID of BPDU 1 is numerically smaller than that of BPDU 2, it is judged that BPDU 1 is better than BPDU 2.

(4) In the case where root ID of BPDU 1 is numerically equal to that of BPDU 2, a root path cost of BPDU 1 is equal to that of BPDU 2, and bridge ID of BPDU 1 is numerically equal to that of BPDU 2, if port ID of BPDU 1 is smaller than that of BPDU 2, it is judged that BPDU 1 is better than BPDU 2.

Then, each bridge compares the initial value of its own BPDU with that of the BPDU from another bridge received from all ports, and selects root ID from the best BPDU.

Next, each bridge computes its own root path cost in accordance with (root path cost)=(root path cost in the best BPDU)+path cost.

A path cost is a cost to the root that each port individually has, and the value of the cost can be set by an administrator.

Once a root ID, a route port, and a root path cost are defined, each bridge updates the content of BPDU transmitted by such each bridge itself.

Further, its own updated BPDU is compared with BPDU received from a port other than root port, and it is judged whether or not each port other than root port is a designated bridge itself.

A port that is a designated bridge is called a designated port, and a port that is not a designated bridge is called a blocked port.

In BPDU transmission and data frame forwarding to a root port, a designated port and a blocked port, a data frame is forwarded at the root port without transmitting BPDU; BPDU is transmitted, and a data frame is forwarded at the designated port; and BPDU is not transmitted, and a data frame is not forwarded at the blocked port.

In this manner, once a spanning tree is configured, each bridge performs regular operations described in (1) to (4) below.

These regular operations are required for reconfiguring a spanning tree that has been configured due to a bridge fault or addition of new bridge.

(1) BPDU includes an element called "message age".

This value denotes an elapsed time after a root bridge has generated a BPDU that corresponds to the above BPDU.

(2) A root bridge transmits its own BPDU periodically to all ports. At this time, "message age" is set to 0.

(3) Each bridge stores a received BPDU, and increases the value of the "message age" of the BPDU stored in each port with an elapse of time (message age timer).

(4) A bridge other than root bridge transmits its own BPDU when it receives a BPDU from a root port.

At this time, as a value of the "message age", there is used a value equal to or greater than the "message age" of the root port and greater than the "message age" of the received BPDU.

Here, the reconfiguration of the spanning tree occurs in any of the cases described in (1) and (2) below.

(1) In the case where the "message age" timer of the stored BPDU times out (in the case where a max age is exceeded); or (2) In the case where a BUDU better than that stored in a port or a BPDU with the small value of the message age is received from the same port.

In the case where any of the above events occurs, a bridge performs re-computation for a root ID, a root path cost, and a root port.

In the meantime, it is very dangerous to perform data frame transmission before all the bridges over a network enters a normal state after configuration (reconfiguration) of a spanning tree has been started.

This is because there is a possibility that a temporary loop occurs during spanning tree configuration.

Therefore, even if each bridge determines its own designated port, it does not start data frame forwarding immediately.

There are four types of the states of each port in a bridge:

(1) listening: No work concerning a data frame is carried out.

(2) learning: Although the learning of a starting MAC address is performed, forwarding is not performed.

(3) forwarding: Data frame forwarding is performed.

(4) disable: This state completely stops the port and does not perform receiving and transmitting of all packets.

The lengths of the listening state and learning state are called a "forward delay". A root bridge determines its value, enters its value in a BPDU, and transmits the fact to each bridge.

In addition, a timer employed in the listening state and learning state is called a "forwarding timer".

If spanning tree reconfiguration occurs, a host position changes, and the contents of an old forwarding table may be incorrect.

Thus, the bridge corresponding to a spanning tree has two kinds of states as timeout values of the forwarding table aging timer as follows.

(1) Normal value: This value is set to a long time such as a few minutes.

(2) A value used after topology change: This value is the same as the forward delay value.

When a bridge senses spanning tree reconfiguration, the timeout value of the forwarding table aging timer is set to a value identical to forward delay for a predetermined period of time.

In the meantime, a spanning tree algorithm and protocol has a system that notifies to all bridges that spanning tree reconfiguration has occurred.

(1) When a bridge senses a topology change, that bridge transmits a frame called TCN-BPDU (Topology Change Notification BPDU) to a root port with hello time intervals.

This transmission is continued until a BPDU in which a TCA (Topology Change Acknowledgment) flag is set has been received from the root port.

(2) A bridge which has received TCN-BPDU also transmits TCN-BPDU to its own root port.

On the other hand, to a port that has received a TCN-BPDU, a BPDU TCA flag is set, and a BPDU is transmitted during transmission of the next BPDU.

(3) In the case where a root bridge receives a TCN-BPDU or the state of its own port changes, the root bridge transmits a BPDU in which a TC (Topology Change) flag is set from that time to a max age+forward delay time.

(4) A bridge which has received the TC flag set BPDU from a root port sets a TC flag for its own BPDU, and transmits such BPDU.

This transmission is continued until a BPDU in which a TC flag is not set has been received.

(5) While a bridge receives TC flag set BPDU from the root port, the bridge uses the value of "forward delay" as a timeout value of the forwarding table aging timer.

In this way, a spanning tree has an algorithm for automatically removing a loop in a redundant bridge network, and automatically sensing a network topology change caused by a device fault or cable failure, thereby automatically changing a network topology so as to prevent a loop from being produced.

In the network configuration using the spanning tree protocol according to ANSI/IEEE Std 802.1D described above, a blocked port is automatically produced thereby to avoid a loop of the network and to use a loop-free route.

However, in the case where the network configuration using the spanning tree according to ANSI/IEEE Std 802.1D described above is employed for FMN as shown in FIG. 27, for example, the problem is posed that a route not necessarily optimum for FMN is formed.

FIG. 27 shows an example of a network configuration (same as FIG. 23) using the spanning tree according to ANSI/IEEE Std 802.1D described above for FMN.

In FIG. 27, the bridges a, b, c constitute mesh network bridges 32.

In the network configuration shown in FIG. 27, the bridge a constitutes a root bridge, and the port near to the bridge d between the bridge b and the bridge d, the port near to the bridge c between the bridge b and the bridge c, and the port near to the bridge d between the bridge c and the bridge d are each set as a blocked port according to the spanning tree protocol.

In the network configuration shown in FIG. 27, therefore, the route for communication from the node a to the node b passes not through the shortest one including the bridge e, the bridge d and the bridge b, but through the bridge e, the bridge d, the bridge a and the bridge b.

Thus, the communication route from the node a to the node b constitutes a detour in the network configuration shown in FIG. 27. As compared with the communication through the shortest path, therefore, the problem of a longer communication time is posed.

Also, this conventional network configuration encounters the problem that an excessive load is imposed on a part of the nodes.

In the case of the network configuration shown in FIG. 27, for example, a blocked port is set by the spanning tree protocol, and therefore, the communication between bridges always passes through the root bridge a. This not only imposes an excessive load on the bridge a, but an extraneous load on a part of lines, thereby leading to the problem that the lines cannot be used efficiently and the line utilization rate is reduced.

Further, the problem of extraneous charge is posed in the case where the mesh network described above is constructed on the Internet and the Ethernet (R) frame is passed through the Internet using L2TP (Layer2 Tunneling Protocol).

L2TP is a means for transmitting the L2 frame of Ethernet or PPP to the Internet in the form encapsulated in IP.

In the case where the mesh network shown in FIG. 27 is constructed on the Internet, for example, the communication from the node a to the node b passes through two routes, one from the mesh network bridge d to the mesh network bridge a, and the other from the mesh network bridge a to the mesh network bridge b. Thus, charge accrues twice and doubles.

In order to obviate this problem and optimize the forwarding in FMN, there has been proposed a method utilizing the optimized forwarding with an improved network configuration using the spanning tree according to ANSI/IEEE Std 802.1D described above for communication between the FMN bridges in CE-based Virtual Private LAN (http://www.ietf.org/internet-draft/draft-lee-ce-based-vpl-00.txt).

This method utilizing the optimized forwarding presupposes no spanning tree operation.

The communication between bridges in this method utilizing the optimized forwarding uses the following algorithms (1) to (4) to secure the shortest path on FMN free of the loop.

(1) The unicast packet received from a FMN connecting port is flooding to all the non-FMN connecting ports but not to the FMN connecting ports.

(2) The multicast packet received from a FMN connecting port is multicasting to all the non-FMN connecting ports but not to the FMN connecting ports.

(3) The unicast packet received from a non-FMN connecting port is flooding to all the FMN connecting ports and all the non-FMN connecting ports.

(4) The multicast packet received from a non-FMN connecting port is multicasting to all the FMN connecting ports and all the non-FMN connecting ports.

In the case of (4), it is recommended that IGMP Snooping be used at the same time to avoid the unnecessary distribution for a further improvement of the line efficiency.

In the case of communication between the bridge c and any other bridge (the bridge a, the bridge b or the bridge d) by the aforementioned method of the optimized forwarding employed for FMN shown in FIG. 23, the bridge that has received a packet from the bridge c does not flood the particular packet to other mesh network bridges.

As a result, the communication between bridges using the method of the optimized forwarding for FMN causes no delay by detour and can be established through the shortest path, thereby leading to the advantage of obviating the problem of the network configuration using the spanning tree of ANSI/IEEE Std 802.1D.

Even in the case where the method of the optimized forwarding is employed for FMN, however, the problem described below is still encountered.

Specifically, in view of the fact that the method using the optimized forwarding described above presupposes no spanning tree operation, no redundant route can be used even in case of a line fault in the communication between bridges.

In the network configuration shown in FIG. 28, for example, assume that the communication between from the node c to the node b develops a line fault between the bridge b and the bridge c. Packets from the node c are flooded to the bridge a and the bridge d. Packets received by the bridge a or the bridge d, however, are not flooded to the bridge b.

Even in the case where a line fault occurs between the bridge b and the bridge c, therefore, no redundant route can be used and the packets from the node c cannot be sent to the node b.

Also, as shown in FIG. 29, in the case where new bridges f and g are added to form a backup route between the bridge a and the bridge c, a loop is formed by the bridge a, the bridge c, the bridge f and the bridge g.

However, in the method of using the optimized forwarding described above, which presupposes no operation of the spanning tree, a loop, if formed in a route on the network, cannot be detected to set a blocking port.

The network shown in FIG. 29, therefore, poses the problem that in the case where a loop is formed on a route on the network, a packet sent out from a given node would undesirably flow through the route forming the loop, thereby reducing the line efficiency.

BRIEF SUMMARY OF THE INVENTION

A first object of the invention is to provide a mesh network bridge wherein in order to avoid a loop between a mesh domain and the outside of the mesh domain using the optimized forwarding as a means for constructing the shortest path, the spanning tree protocol rendered operable even in the optimized forwarding environment is used for the whole network including the mesh domain and the outside of the mesh domain, thereby reducing the delay due to the detour of the communication route in the network and the excessive load on a part of the devices in the network for an improved line utilization while at the same time improving the communication efficiency by avoiding the loop outside the mesh domain.

A second object of the invention is to provide a mesh network bridge wherein the backup protocol is rendered operable at the time of a line fault in the optimized forwarding environment used as a means for constructing the shortest path, so that the route is immediately changed in case of a line fault thereby to accelerate the restoration from the suspension of communication for an improved communication efficiency.

A third object of the invention is to provide a mesh network bridge wherein the spanning tree is rendered operable even in the optimized forwarding environment used as a means for constructing the shortest path thereby to reduce the delay due to the detour of the communication route in the network and the excessive load on a part of the devices in the network on the one hand and improve the line utilization rate and the communication efficiency by avoiding the loop outside the mesh domain on the other hand, while at the same time the backup protocol is rendered operable at the time of a line fault even in the optimized forwarding environment thereby to change the route immediately in case of a line fault and thus accelerate the restoration from the suspension of communication for an improved communication efficiency.

To achieve the above first object, according to a first aspect of the invention, there is provided a mesh network bridge having a plurality of mesh-connecting ports (3) to interconnect a plurality of bridges including an own bridge and other bridges as a mesh network, comprising:

a packet transmitter/receiver (12) which reciprocally transmits and receives packets between the plurality of bridges through the plurality of mesh-connecting ports;

a shortest path constructing unit (11) which constructs the shortest path between the plurality of bridges through the packet transmitter/receiver; and a STP processing unit (5) which executes STP processing to activate a spanning tree protocol (STP) for attaching redundancy to the mesh network with the shortest path constructed between the plurality of bridges by the shortest path constructing unit.

To achieve the above first object, according to a second aspect of the invention, there is provided a mesh network bridge according to the first aspect, wherein the STP processing unit comprises:

a logic port storage unit (18) which stores the plurality of mesh-connecting ports and at least one logic port related to the plurality of mesh-connecting ports;

a rereading unit (13) which receives,BPDU (configuration bridge protocol data units) of the other bridges from any one of the plurality of mesh-connecting ports through the packet transmitter/receiver, and rereads the BPDU as having been received from the logic port stored in the logic port storage unit;

a BPDU receiving unit (14) which receives the BPDU reread by the rereading unit as having been received from the logic port;

a STP information management unit (16) which determines STP status of the logic port based on the BPDU received by the BPDU receiving unit;

a STP information storage unit (19) which receives and stores the information on the STP status determined by the STP information management unit;

a BPDU transmitting unit (15) which transmits the BPDU to the other bridges through the packet transmitter/receiver based on the STP status stored in the STP information storage unit, in such a manner that in the case where the BPDU are transmitted from the logic port, the BPDU having the same root path cost and the same port priority are transmitted from all of the plurality of mesh-connecting ports related to the logic port; and a port status setting unit (17) which sets to the same STP status as the logic port all of the plurality of mesh-connecting ports related to the logic port, based on the STP status stored in the STP information storage unit.

To achieve the above first object, according to a third aspect of the invention, there is provided a mesh network bridge according to the first aspect, wherein a method utilizing optimized forwarding as the shortest path constructing unit is employed.

To achieve the above first object, according to a fourth aspect of the invention, there is provided a mesh network bridge according to the first aspect, wherein the shortest path constructing unit receives from the packet transmitter/receiver a packet to be transmitted outside, and performs an output process required to determine an optimum port for forwarding the packet.

To achieve the above first object, according to a fifth aspect of the invention, there is provided a mesh network bridge according to the third aspect, further comprising a forwarding table storing the destination port for a packet to be transmitted, wherein the packet transmitter/receiver accesses the forwarding table through the shortest path constructing unit, and in the case where the destination port is known for the packet to be transmitted, outputs the packet to the destination port, the packet transmitter/receiver executing a predetermined flooding process based on the optimized forwarding algorithm in the case where the destination is unknown.

To achieve the above first object, according to a sixth aspect of the invention, there is provided a mesh network bridge according to the first aspect, further comprising a non-mesh-connecting port, wherein the packet transmitter/receiver performs transmitting and receiving packets between other mesh network bridges connected to the non-mesh-connecting ports, nodes and non-mesh network bridges.

To achieve the above second object, according to a seventh aspect of the invention, there is provided a mesh network bridge comprising a plurality of mesh-connecting ports (3) for interconnecting a plurality of bridges including an own bridge and other bridges as a mesh network, comprising:

a packet transmitter/receiver which (12) reciprocally transmits and receives packets between the plurality of bridges through the plurality of mesh-connecting ports;

a shortest path constructing unit (11) which constructs the shortest path between the plurality of bridges through the packet transmitter/receiver; and a backup processing unit (6) which executes backup processing to activate a backup protocol for forming a backup route in such a manner that, with the shortest path constructed between the plurality of bridges by the shortest path constructing unit, a first mesh network bridge detected a line fault is continuously left in a mesh domain, and a second mesh network bridge rendered unreachable of a packet by the line fault is reached the packet through a third mesh network bridge connected to the second mesh network bridge.

To achieve the above second object, according to an eighth aspect of the invention, there is provided a mesh network bridge according to the seventh aspect, wherein the backup processing unit comprises:

a backup candidate memory (27) which stores, related to each other, information for identifying the plurality of mesh-connecting ports, information for identifying neighboring bridges connected to the plurality of mesh-connecting ports, and information for identifying bridges constituting candidates for the neighboring bridges;

a line fault detecting unit (21) which detects a line fault between a first other bridge connected to the plurality of mesh-connecting ports;

a backup bridge selecting unit (22) which selects, upon detection of a line fault by the line fault detecting unit, a second other bridge connected to the mesh network from the backup candidate memory in order to form a backup route which data to be transmitted to the first other bridge reach the first other bridge through the second other bridge;

a backup request sending unit (23) which sends out, through the packet transmitter/receiver, a backup request packet containing information for identifying the first other bridge to the second other bridge selected by the backup bridge selecting unit, while at the same time requests, upon receipt of the data to be sent to the first other bridge, the second other bridge to form a first route for sending the data to the second other bridge;

a backup request receiving unit (24) which issue, upon receipt of a backup request packet from a third other bridge as the second other bridge through the packet transmitter/receiver, a request to form a second route for sending out data from the third other bridge to the first other bridge as viewed from the third other bridge identified by identification information contained in the backup request packet; and a route control unit (25) which causes the shortest path constructing unit to form a route corresponding to selected one of the first route requested to form by the backup request sending unit and the second route requested to form by the backup request receiving unit.

To achieve the above second object, according to a ninth aspect of the invention, there is provided a mesh network bridge according to the eighth aspect, wherein a method utilizing optimized forwarding as the shortest path constructing unit is employed.

To achieve the above second object, according to a tenth aspect of the invention, there is provided a mesh network bridge according to the seventh aspect, wherein the shortest path constructing unit receives a packet to be transmitted outside from the packet transmitter/receiver and performs an output process for determining the optimum port for forwarding the packet.

To achieve the above second object, according to an eleventh aspect of the invention, there is provided a mesh network bridge according to the seventh aspect, further comprising a forwarding table (20) storing a destination port for a packet to be transmitted;

wherein the packet transmitter/receiver accesses the forwarding table through the shortest path constructing unit, and in the case where the destination port is known for the packet to be transmitted, outputs the packet to the destination port, the packet transmitter/receiver executing a predetermined flooding process based on the optimized forwarding algorithm in the case where the destination is unknown.

To achieve the above second object, according to a twelfth aspect of the invention, there is provided a mesh network bridge according to the seventh aspect, further comprising a non-mesh-connecting port, wherein the packet transmitter/receiver performs transmitting and receiving packets between other mesh network bridges connected to the non-mesh-connecting ports, nodes and non-mesh network bridges.

To achieve the above second object, according to a thirteenth aspect of the invention, there is provided a mesh network bridge according to the eighth aspect, further comprising a backup candidate memory control unit (26), wherein a neighbor notification packet containing information on the other bridges connected to any one of the plurality of mesh-connecting ports of the own bridge is sent out to the packet transmitter/receiver, and upon receipt of the neighbor notification packet from the other bridges through the packet transmitter/receiver, a receiving port number, a source address and information on the neighboring bridge are retrieved and stored in the backup candidate memory.

To achieve the above second object, according to a fourteenth aspect of the invention, there is provided a mesh network bridge according to the thirteenth aspect, wherein the backup candidate memory control unit stores a remaining monitor time for detecting a line fault in the backup candidate memory, while regularly monitoring the remaining monitor time, and upon detection of the failure to send the neighbor notification packet for a predetermined period of time, notifies the line fault detecting unit that a line fault has occurred.

To achieve the above second object, according to a fifteenth aspect of the invention, there is provided a mesh network bridge according to the ninth aspect, wherein the route control unit, upon receipt of a request from selected one of the backup request sending unit and the backup request receiving unit to form a backup route, requests the shortest path constructing unit to execute an exceptional process for the optimized forwarding to form a requested backup route, and upon receipt of a request to cancel the backup route, requests the shortest path constructing unit to stop the exceptional process for the requested backup route.

To achieve the above second object, according to a sixteenth aspect of the invention, there is provided a mesh network bridge according to the eighth aspect, further comprising a backup receiving table (28), wherein the backup request receiving unit, upon receipt of a backup request packet from the other bridges through the packet transmitter/receiver, (1) registers in the backup receiving table a connecting port that has received the packet, a backup target (unreachable bridge) and a backup source (requesting bridge) indicated by the packet and a remaining monitor time, (2) upon receipt of a packet having a backup target as a destination from the backup source, requests the route control unit to form a route for sending out the packet to the backup target, (3) in the case where combination of the backup source and the backup target indicated by the backup request packet is already stored in the backup receiving table, sets the remaining monitor time to an initial value, and (4) regularly checks the remaining monitor time, and upon expiry of the remaining monitor time or upon receipt of a request from the packet transmitter/receiver to cancel the backup, deletes the backup route items (the backup source, the backup target, and the remaining time) from the backup receiving table while at the same time requesting the route control unit to block the backup route.

To achieve the above second object, according to a seventeenth aspect of the invention, there is provided a mesh network bridge according to the eighth aspect, wherein the backup bridge selecting unit, upon receipt of a notified port number associated with a line fault from the line fault detecting unit and in the case where the port is one of the plurality of mesh-connecting ports, finds a neighboring bridge (unreachable bridge) connected to a port of the notified port number from the backup candidate memory, selects, as a requestee bridge, a neighboring bridge having the unreachable bridge as a backup candidate, notifies the backup request sending unit, and in order to indicate occurrence of a line fault to connected port notified of the line fault, rewrites the remaining time of the connecting port of the backup candidate memory to zero.

To achieve the above third object, according to an eighteenth aspect of the invention, there is provided a mesh network bridge having a plurality of mesh-connecting ports (3) to connect a plurality of bridges including an own bridge and other bridges as a mesh network, comprising:

a packet transmitter/receiver (12) which reciprocally transmits and receives packets between the plurality of bridges through the plurality of mesh-connecting ports;

a shortest path constructing unit (11) which constructs the shortest path between the plurality of bridges through the packet transmitter/receiver;

a STP processing unit (5) which executes STP processing to activate a spanning tree protocol (STP) for attaching redundancy to the mesh network with the shortest path constructed between the plurality of bridges by the shortest path constructing unit; and a backup processing unit (6) which executes backup process to activate a backup protocol for forming a backup route in such a manner that, with the shortest path constructed between the plurality of bridges by the shortest path constructing unit, a first mesh network bridge detected a line fault is continuously left in a mesh domain, and a second mesh network bridge rendered unreachable of a packet by the line fault is reached the packet through a third mesh network bridge connected to the second mesh network bridge.

To achieve the above third object, according to a nineteenth aspect of the invention, there is provided a mesh network bridge according to the eighteenth aspect, wherein the STP processing unit comprises:

a logic port storage unit (18) which stores the plurality of mesh-connecting ports and at least one logic port related to the plurality of mesh-connecting ports;

a rereading unit (13) which receives BPDU (configuration bridge protocol data units) of the other bridges from any one of the plurality of mesh-connecting ports through the packet transmitter/receiver, and rereads the BPDU as having been received from the logic port stored in the logic port storage unit;

a BPDU receiving unit (14) which receives the BPDU reread by the rereading unit as having been received from the logic port;

a STP information management unit (16) which determines STP status of the logic port based on the BPDU received by the BPDU receiving unit;

a STP information storage unit (19) which receives and stores information on the STP status determined by the STP information management unit;

a BPDU transmitting unit (15) which transmits the BPDU to the other bridges through the packet transmitter/receiver based on the STP status stored in the STP information storage unit, sends the BPDU having the same root path cost and the same port priority from all of the plurality of mesh-connecting ports related to the logic port; and a port status setting unit (17) which sets all of the plurality of mesh-connecting ports related to the logic port in the same STP status as the logic port, based on the STP status stored in the STP information storage unit.

To achieve the above third object, according to a twentieth aspect of the invention, there is provided a mesh network bridge according to the eighteenth aspect, wherein the backup processing unit comprises:

a backup candidate memory (27) which stores, related to each other, information for identifying the plurality of mesh-connecting ports, information for identifying neighboring bridges connected to the plurality of mesh-connecting ports, and information for identifying bridges constituting candidates for the neighboring bridges;

a line fault detecting unit (21) which detects a line fault between a first other bridge connected to the plurality of mesh-connecting ports;

a backup bridge selecting unit (22) which selects, upon detection of a line fault by the line fault detecting unit, a second other bridge connected to the mesh network from the backup candidate memory in order to form a backup route which data to be transmitted to the first other bridge reaches the first other bridge through the second other bridge;

a backup request sending unit (24) which sends out, through the packet transmitter/receiver, a backup request packet containing information for identifying the first other bridge to the second other bridge selected by the backup bridge selecting unit, which at the same time requests, upon receipt of the data to be sent to the first other bridge, the second other bridge to form a first route for sending the data to the second other bridge;

a backup request receiving unit (25) which issues, upon receipt of a backup request packet from a third other bridge as the second other bridge through the packet transmitter/receiver, a request to form a second route for sending out data from the third other bridge to the first other bridge as viewed from the third other bridge identified by identification information contained in the backup request packet; and a route control unit which causes the shortest path constructing unit to form a route corresponding to selected one of the first route requested to form by the backup request sending unit and the second route requested to form by the backup request receiving unit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiment of the invention, and together with the general description given above and the detailed description of the preferred embodiment given below, serve to explain the principles of the invention.

FIG. 10 is a diagram for explaining the relationship between a neighbor notification packet and a backup candidate table in a mesh network employing the mesh network bridge according to the invention;

FIG. 11 is a diagram for explaining the route restoration in response to a backup request in the mesh network employing the mesh network bridge according to the invention;

FIG. 12 is a diagram showing an example of a backup candidate table of a mesh network bridge according to the invention;

FIG. 13 is a diagram showing an example of a backup receiving table of a mesh network bridge according to the invention;

FIG. 14 is a diagram showing a format of a mesh control packet used in a mesh network employing the mesh network bridge according to the invention;

FIG. 15 is a diagram showing an option format for neighbor notification in the format of FIG. 14;

FIG. 16 is a diagram showing an option format for requesting or canceling the backup in the format shown in FIG. 14;

DETAILED DESCRIPTION OF THE INVENTION

Figure 1:
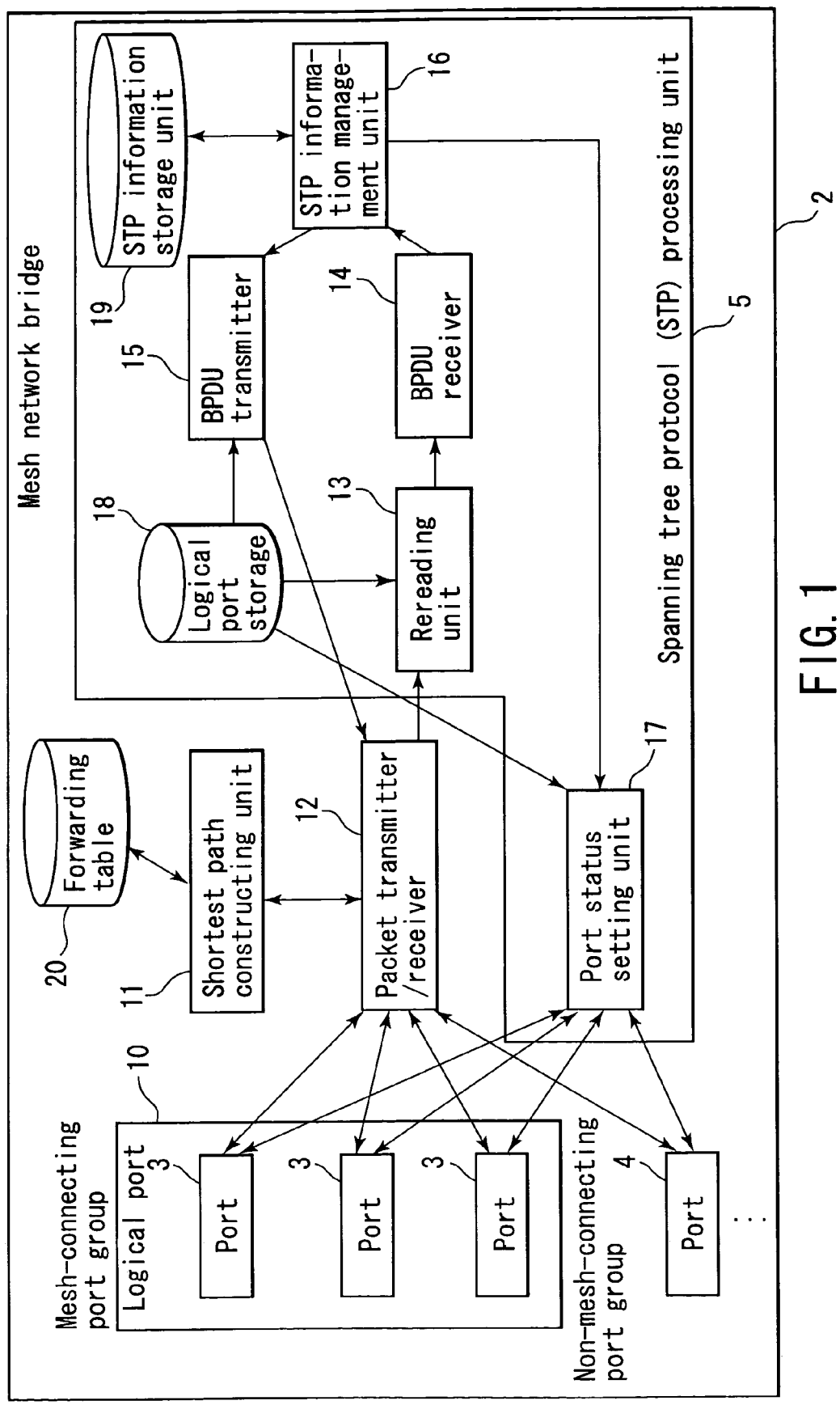
FIG. 1 is a block diagram showing a general configuration of a mesh network bridge according to a first embodiment of the invention.

Reference will now be made in detail to the presently preferred embodiments of the invention as illustrated in the accompanying drawings, in which like reference numerals designate like or corresponding parts.

First Embodiment

FIG. 1 is a block diagram showing a general configuration of a mesh network bridge according to a first embodiment of the invention.

Figure 4:
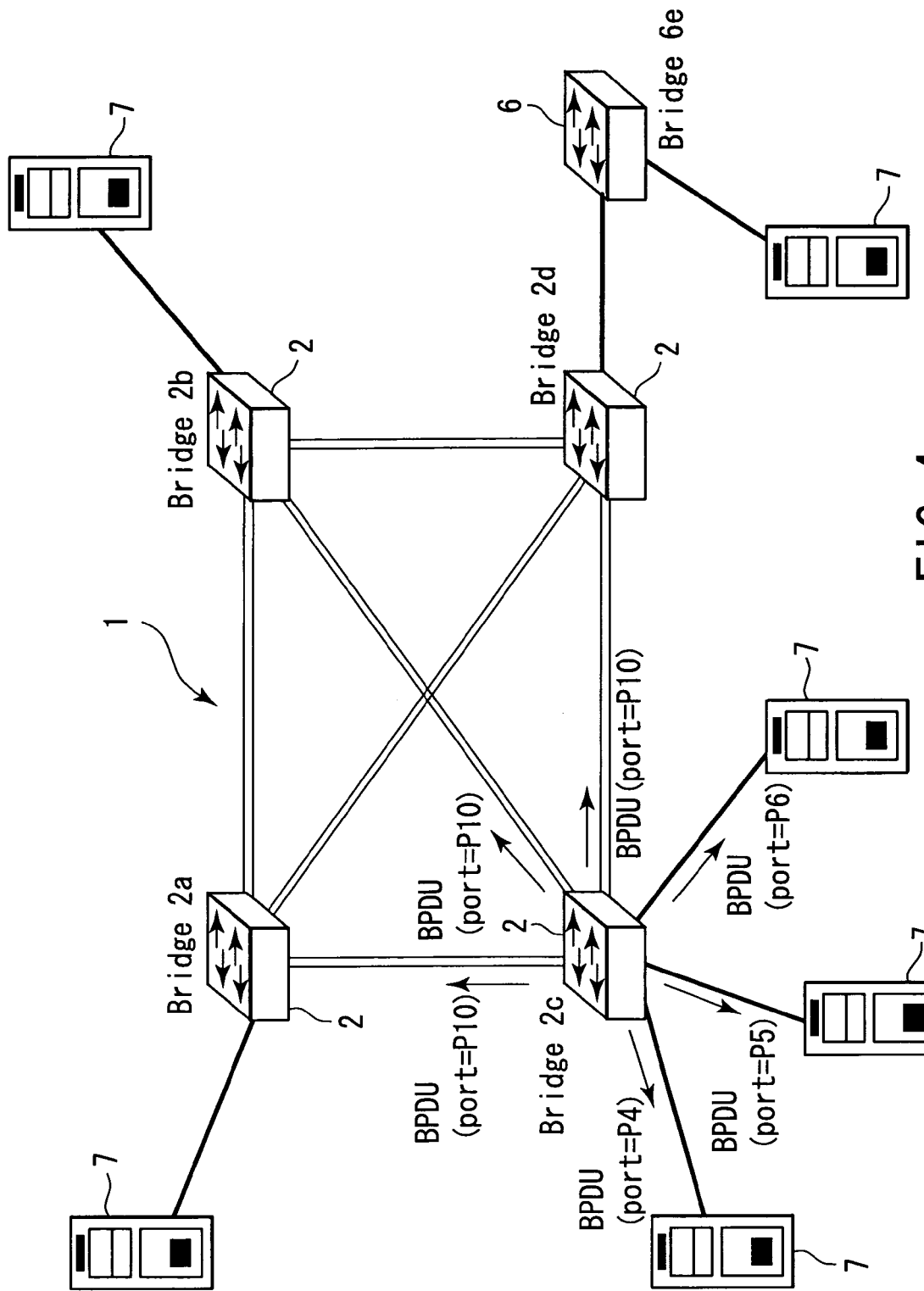
FIG. 4 is a diagram showing an example of a mesh network employing mesh network bridges according to the invention.

FIG. 4 is a diagram showing an example of a mesh network employing the mesh network bridges according to the invention.

Figure 5:
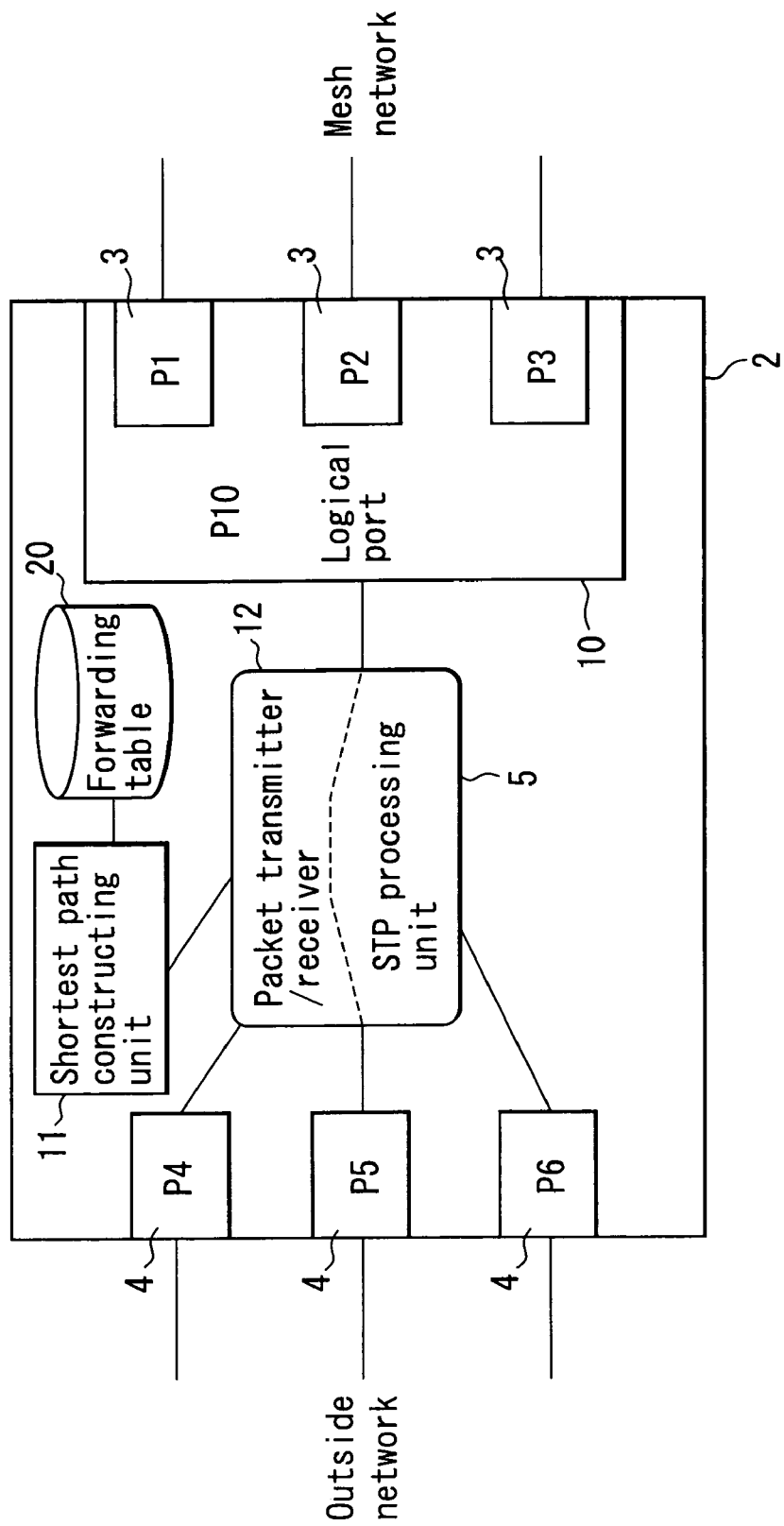
FIG. 5 is a schematic diagram showing that BPDU is sent out by the mesh-connecting ports regarded as a single logical port by STP in the mesh network shown in FIG. 4.

FIG. 5 is a schematic diagram showing that the spanning tree protocol (STP) logically regards the mesh connecting ports as one port and sends out BPDU in the mesh network of FIG. 4.

FIGS. 6A to 6D are diagrams showing frame formats of BPDU.

Figure 7:
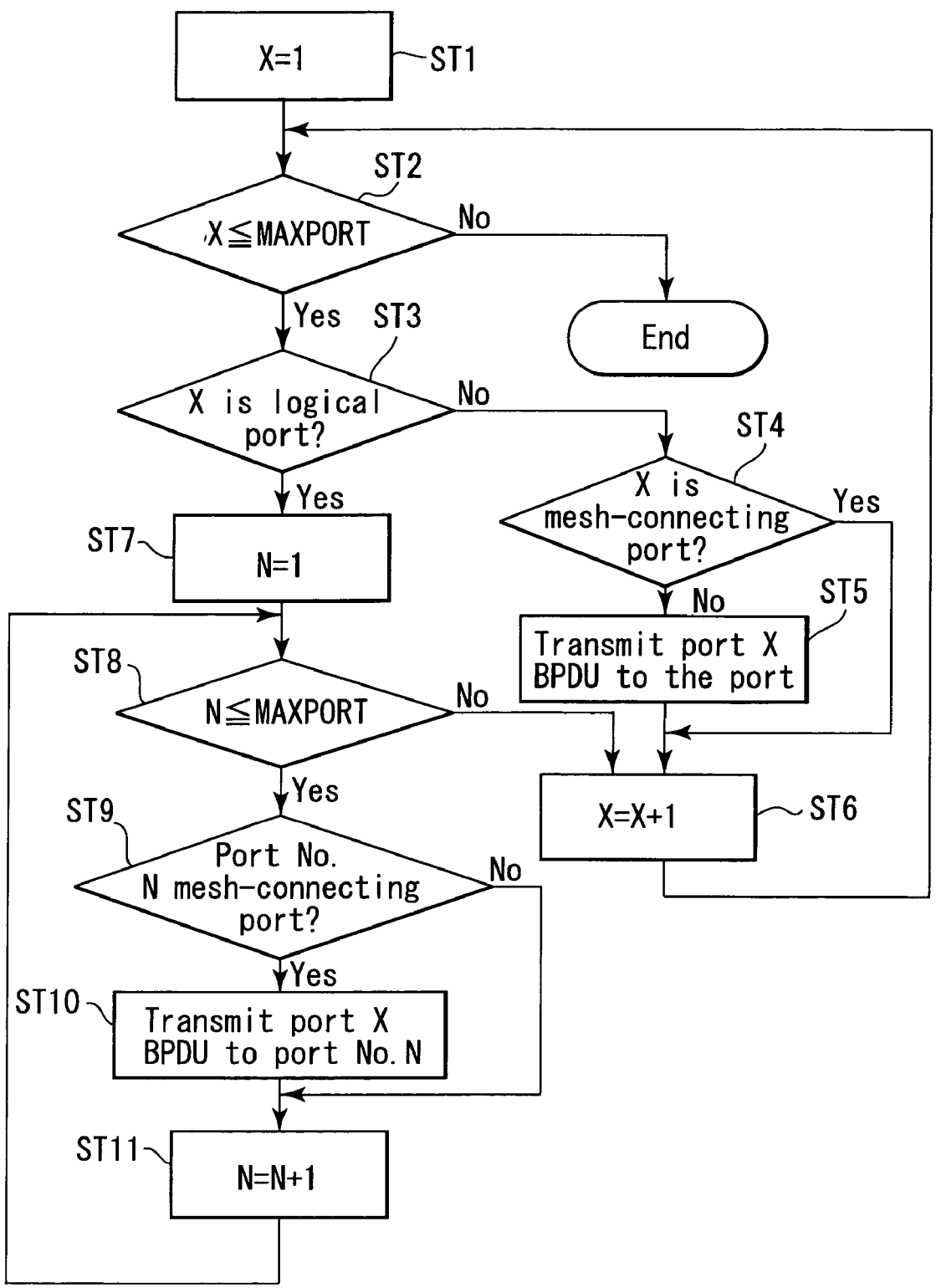
FIG. 7 is a flowchart for explaining the BPDU transmission process in a mesh network employing the mesh network bridge according to the invention.

FIG. 7 is a flowchart for the BPDU transmission process of a mesh network bridge according to the invention.

Figure 8:
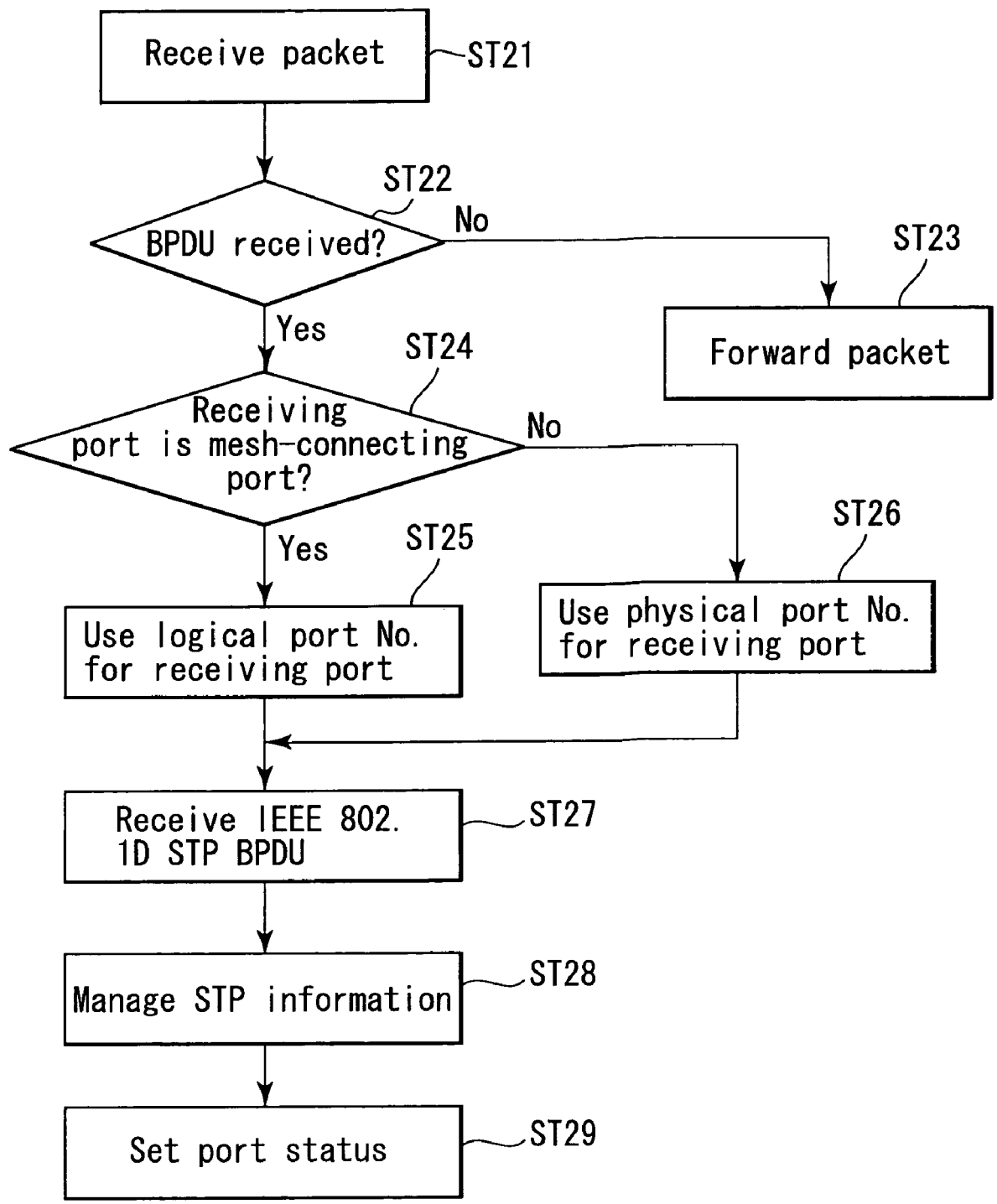
FIG. 8 is a flowchart for explaining the BPDU receiving process in a mesh network employing the mesh network bridge according to the invention.

FIG. 8 is a flowchart for the BPDU receiving process of a mesh network bridge according to the invention.

Figure 9A:
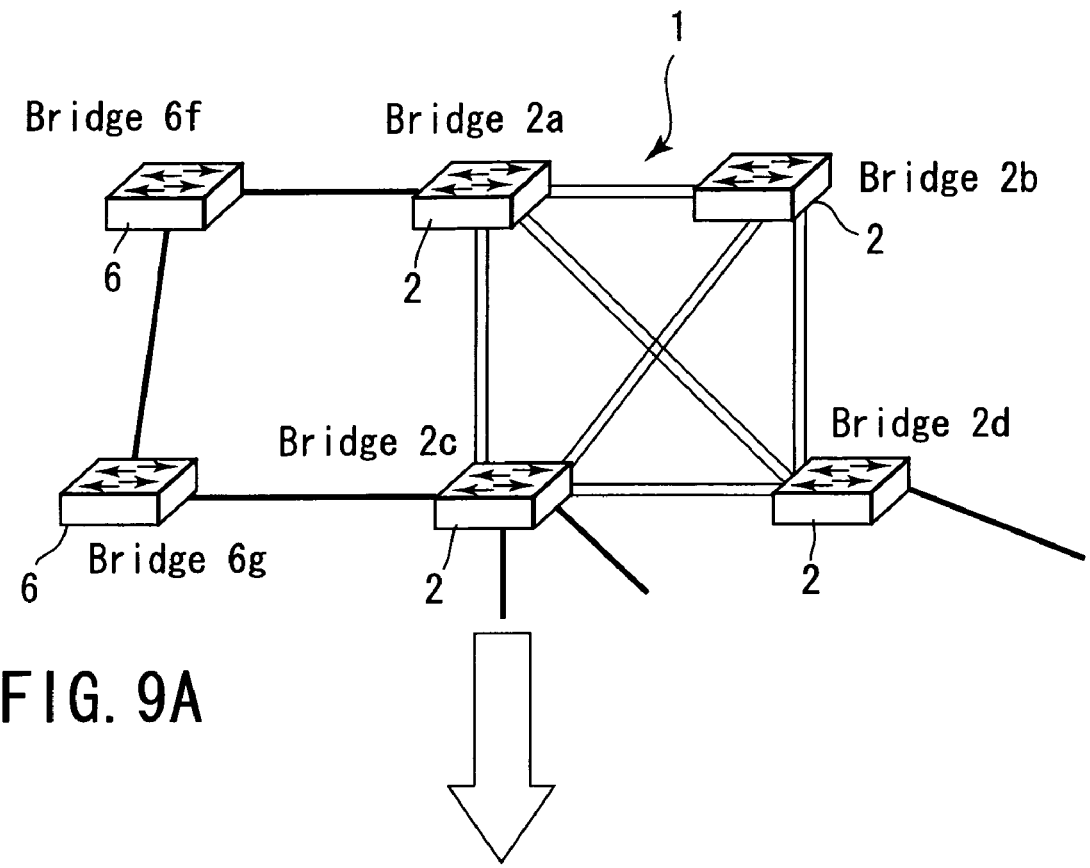
FIG. 9A is a diagram showing an example of a mesh network for explaining the state of the network at the time of STP operation in the mesh network employing the mesh network bridge according to the invention.
Figure 9B:
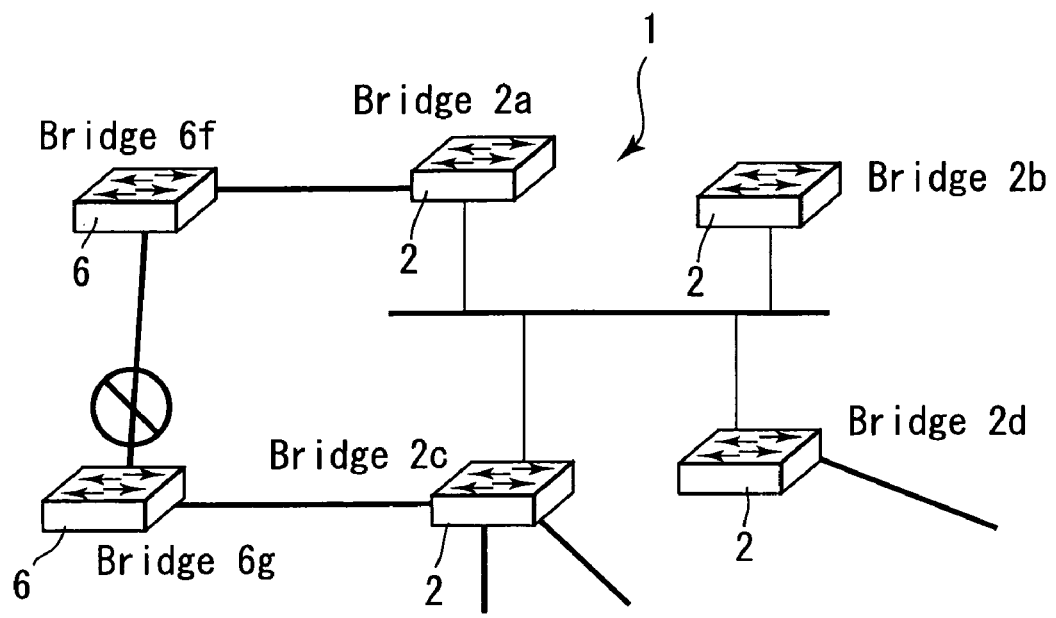
FIG. 9B is a diagram showing an equivalent state of the network at the time of STP operation in the network shown in FIG. 9A.

FIGS. 9A and 9B are equivalent diagrams in terms of STP showing a mesh network employing a mesh network bridge according to the invention.

Figures 19, 20, 24:
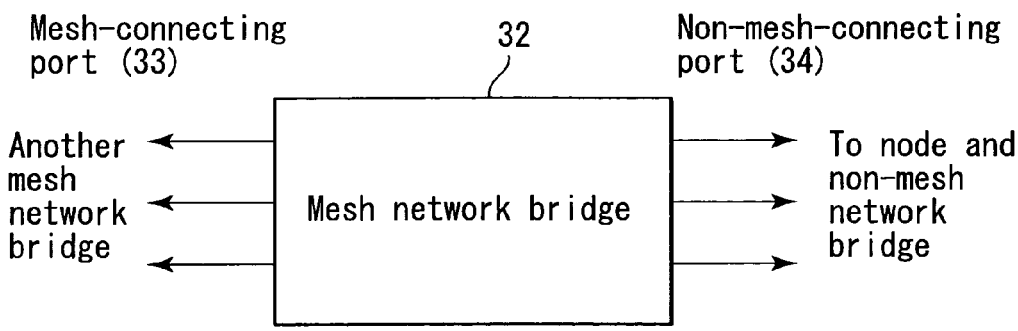
FIG. 19 is a diagram showing an example of a logical port table in the mesh network bridge according to the invention.
FIG. 20 is a diagram showing an example of a STP information table in the mesh network bridge according to the invention.
FIG. 24 is a schematic diagram showing the mesh network bridge used in the conventional FMN.

FIG. 19 is a diagram showing a format of a logical port storage unit according to the embodiment of FIG. 1.

FIG. 20 is a diagram showing a format of the STP information storage unit of FIG. 1.

Figure 21:
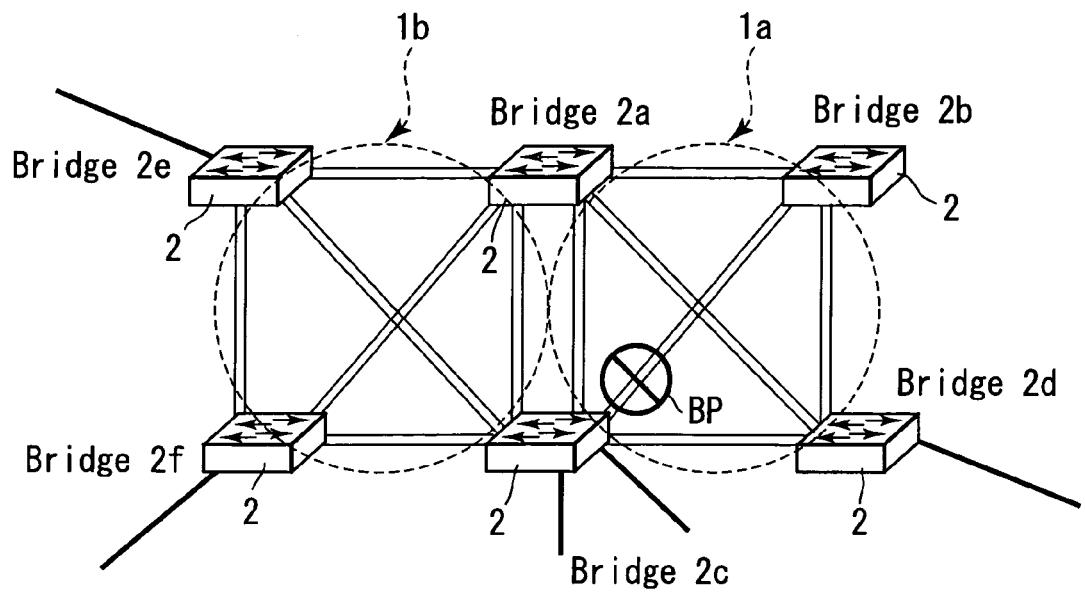
FIG. 21 is a diagram showing an example of a network including two mesh networks employing the mesh network bridge according to the invention.

FIG. 21 is a diagram for explaining a case in which a mesh network bridge has a plurality of logical ports.

Figure 22:
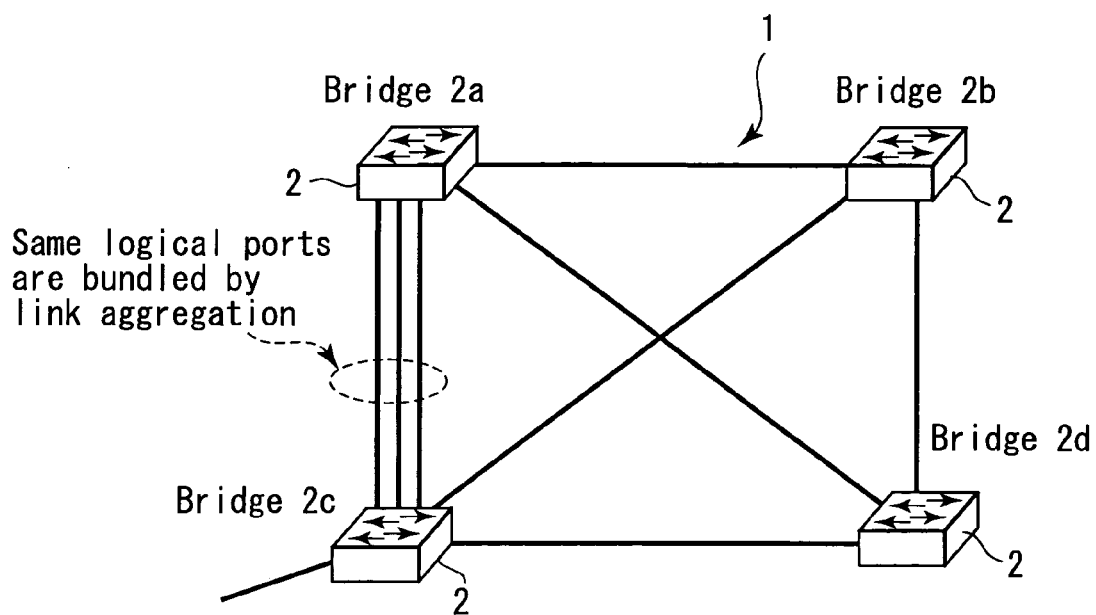
FIG. 22 is a diagram showing a case of a plurality of lines between the bridges a mesh network employing the mesh network bridge according to the invention.
Figure 23:
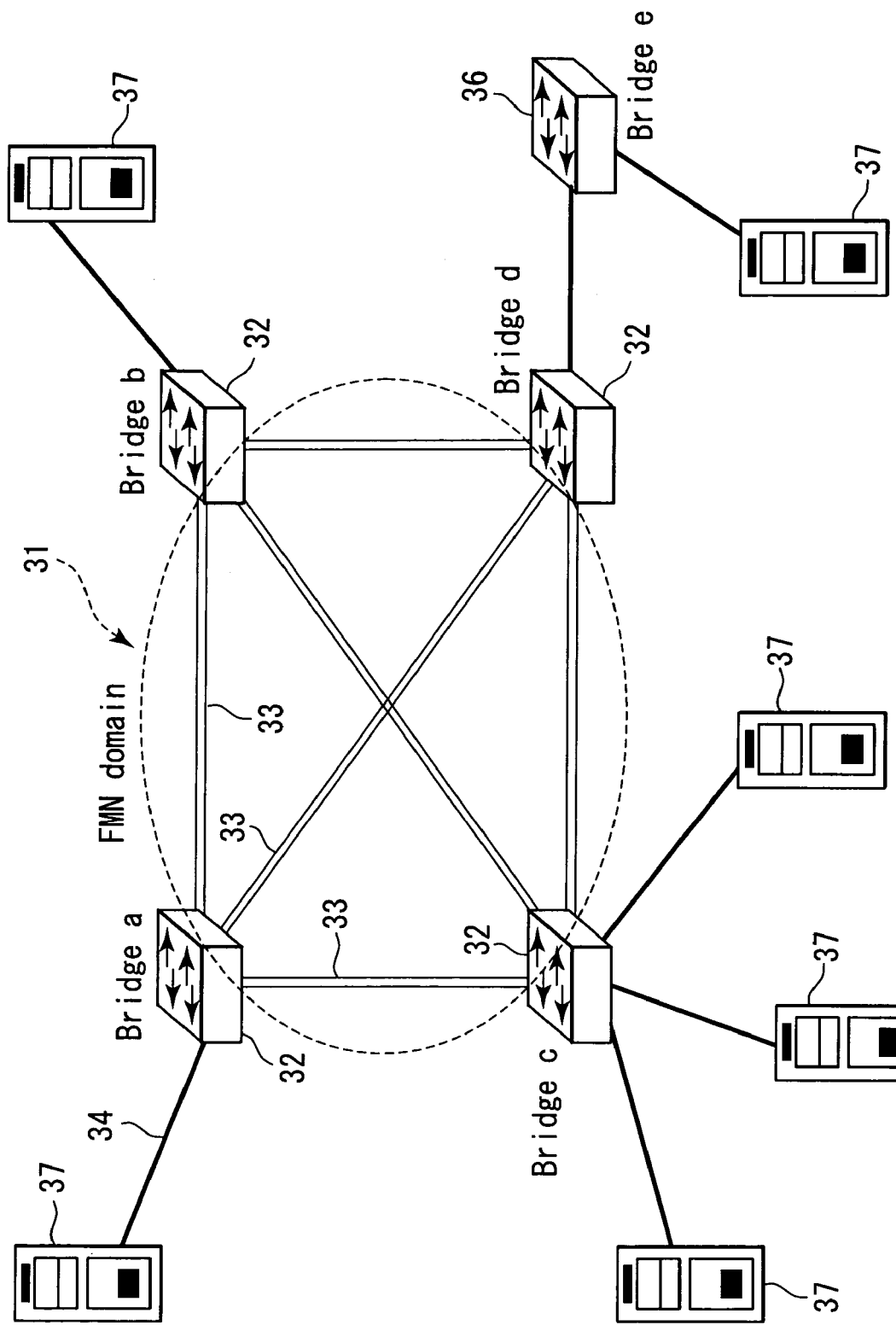
FIG. 23 is a diagram showing an example of the conventional FMN.
Figure 25:
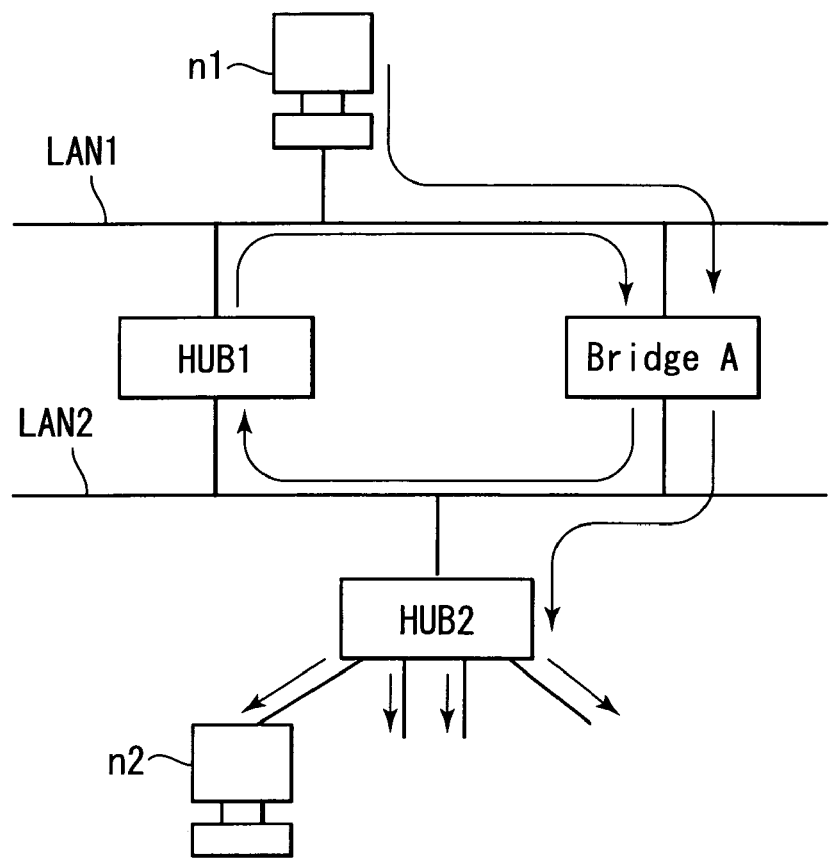
FIG. 25 is a diagram for explaining the objective of the conventional spanning tree.
Figure 26:
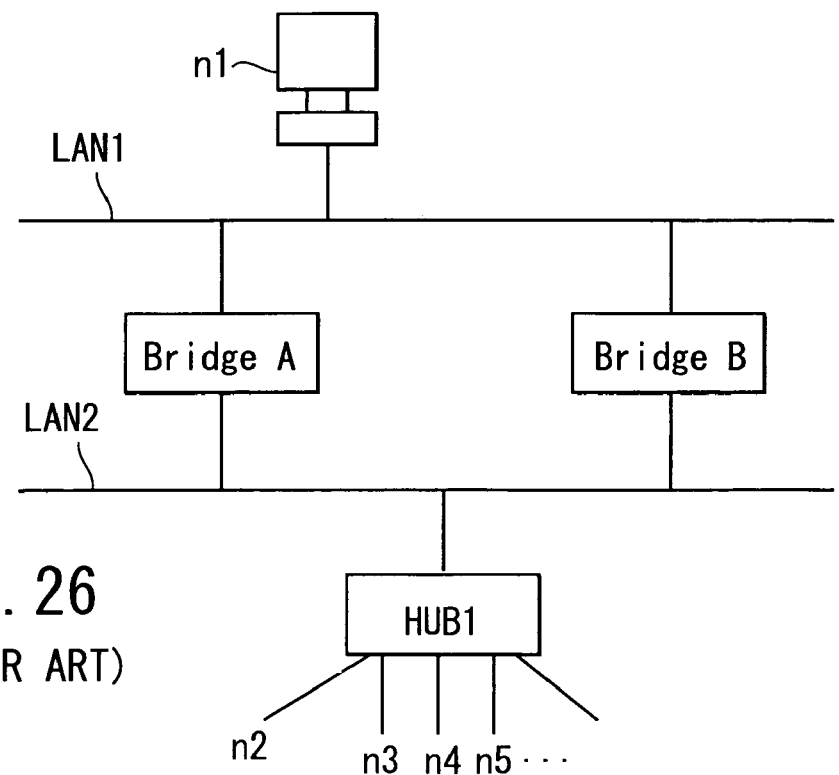
FIG. 26 is another diagram for explaining the objective of the conventional spanning tree.
Figure 27:
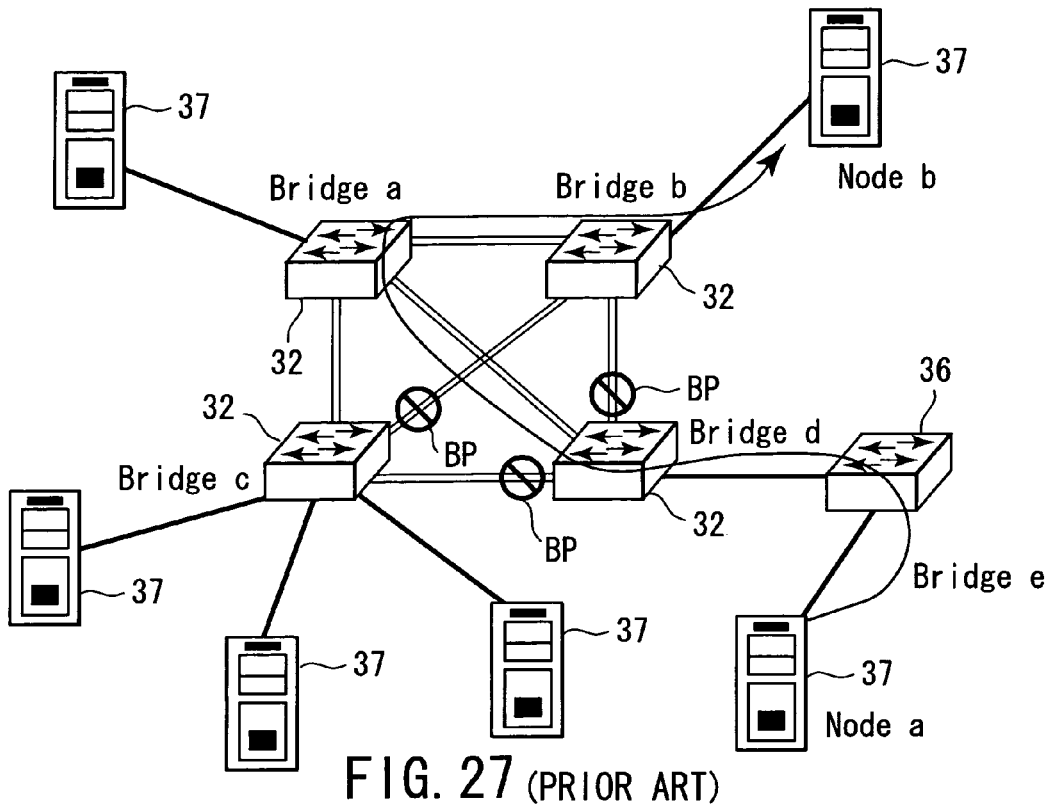
FIG. 27 is a diagram showing an example of the conventional mesh network using the spanning tree.
Figure 28:
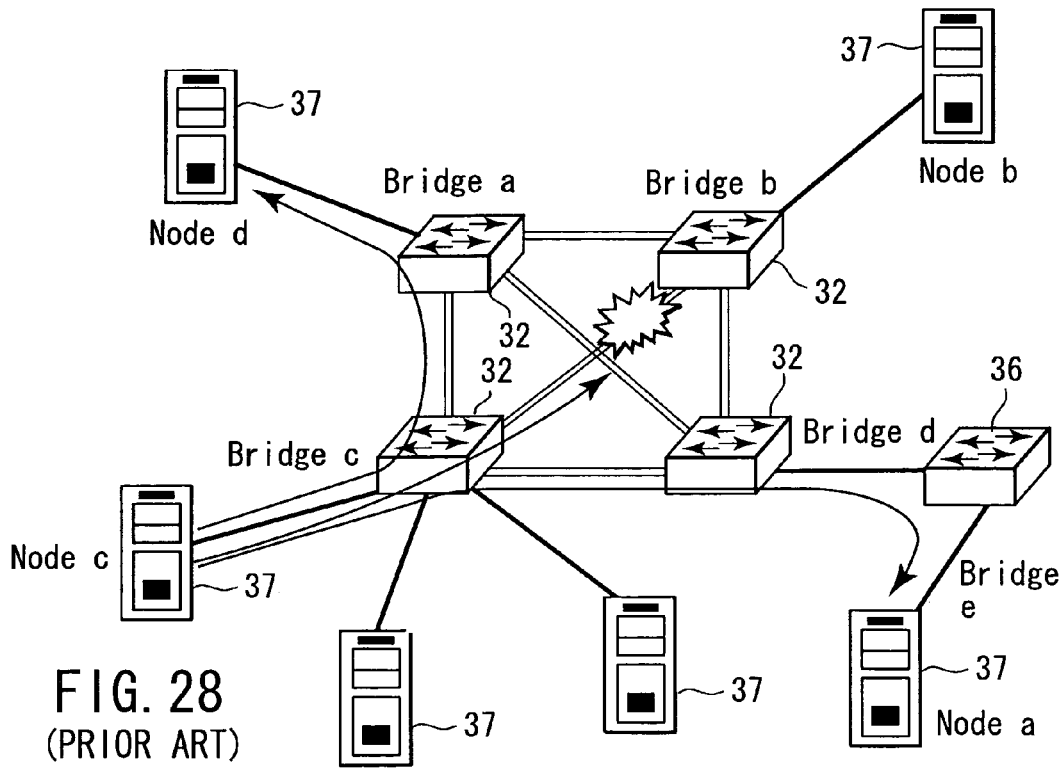
FIG. 28 is a diagram for explaining the problems encountered in the case where the optimized forwarding is employed for the conventional mesh network.
Figure 29:
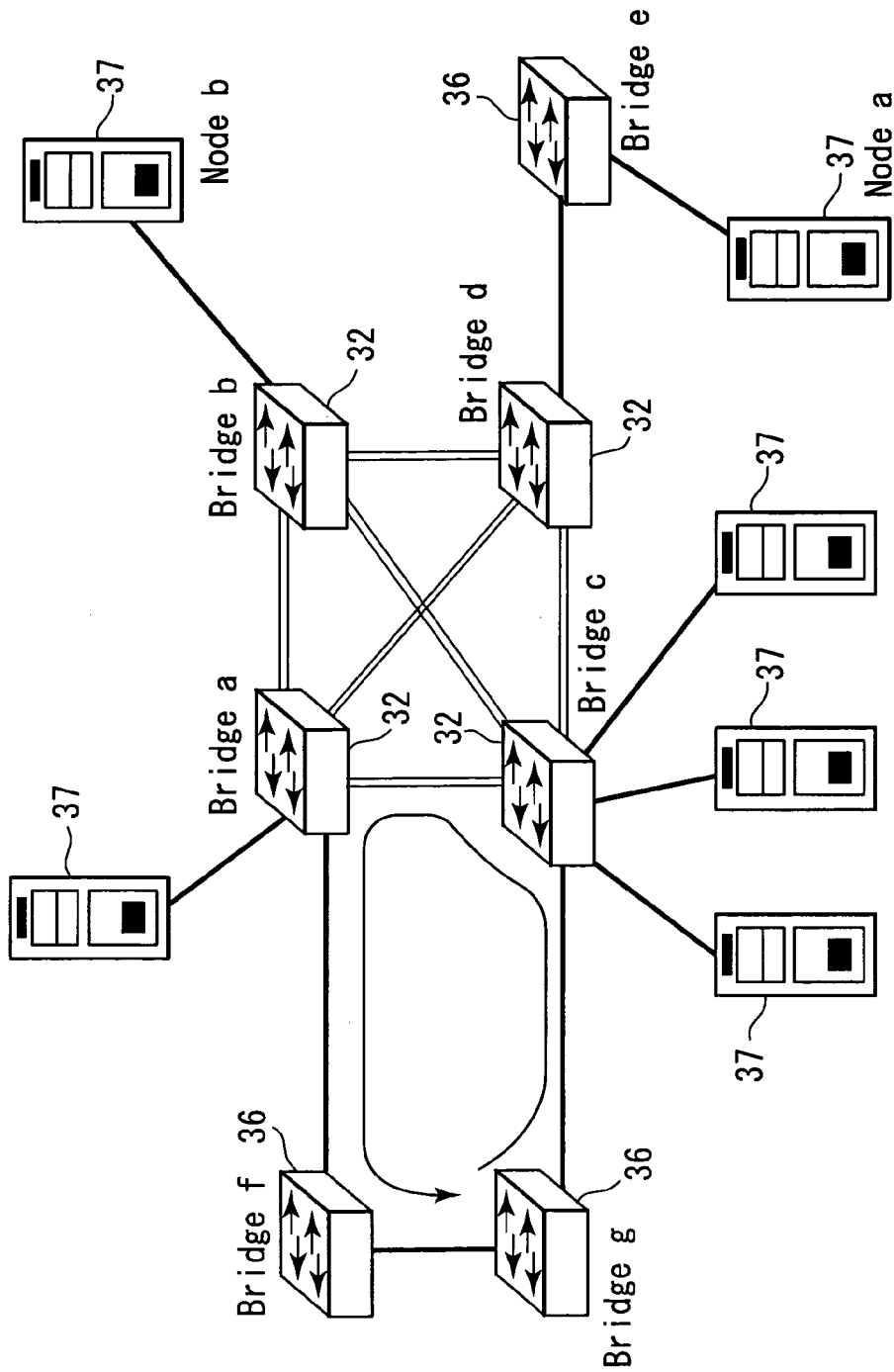
FIG. 29 is another diagram for explaining the problems encountered in the case where the optimized forwarding is employed for the conventional mesh network.

FIG. 22 is a diagram for explaining a case in which a plurality of lines exist between mesh network bridges.

First, the first embodiment of the invention will be briefly described.

As described above, in a mesh network using the shortest path constructing-means (means for optimized forwarding), the spanning tree protocol (STP) is not used as described above.

Since the avoidance of a loop with the outside of the mesh domain is required, however, the network as a whole including the outside of the mesh domain requires exchange of the spanning tree protocol.

In view of this, this embodiment implements the use of the spanning tree protocol for the whole network including the mesh domain and the outside of the mesh domain to avoid a loop between the mesh domain and the outside of the mesh domain using the shortest path constructing means (means for optimized forwarding).

The configuration of a mesh network bridge according to a first embodiment of the invention will be described below with reference to FIG. 1.

A shortest path constructing unit 11, when a packet transmitter/receiver 12 receives a packet to be transmitted outside, executes the output process for determining the optimum output port to which the packet is to be forwarded.

The packet transmitter/receiver 12 executes the forwarding and learning process based on the rules of the spanning tree protocol of ANSI/IEEE Std 802.1D described above, and accesses a forwarding table 20 through the shortest path constructing unit 11. In the case where the destination port is known for the packet to be transmitted, the packet is output to the particular destination port, while in the case where the destination is unknown, on the other hand, a predetermined flooding process is executed based on the optimized forwarding algorithm.

According to ANSI/IEEE Std 802.1D, the flooding process is executed by output to all the ports, whereby the shortest path is constructed by the use of the four rules of the optimized forwarding algorithm described above.

The packet transmitter/receiver 12 transmits and receives packets to and from another mesh network bridge 2, a node 7 and a bridge 6 (a bridge 6e, for example, in FIG. 4) other than the mesh network bridge 2, connected to the local port (a mesh-connecting port 3 and a non-mesh-connecting port 4).

The types of the packets transmitted and received in the process are mesh controlled packets including BPDU described above, a neighbor notification packet described later, a backup request/cancel packet, etc.

As the internal operation of the packet transmitter/receiver 12, according to the first embodiment, the BPDU received are delivered to a rereading unit 13 together with the receiving port number, and the BPDU delivered from a BPDU transmitting unit 5 are sent out to designated ports 3, 4.

A STP processing unit 5 manages a STP information storage unit 19 based on the BPDU received by the local port (the mesh-connecting port 3 and the non-mesh-connecting port 4), determines the STP status, and controls the spanning tree protocol for sending out BPDU to the local port.

In this case, the STP processing unit 5 processes the mesh-connecting ports 3 related to the same logical port 10, as a logically single port.

Specifically, as shown in FIG. 5, the STP processing unit 5 recognizes not the ports P1, P2, P3 constituting the mesh-connecting ports 3, 3, 3 related to the same logical port 10 through the packet transmitter/receiver 12, but both the port P10 constituting the logical port 10 and the ports P4, P5, P6 constituting the non-mesh-connecting ports 4, 4, 4.

The STP processing unit 5 is configured of seven blocks including the rereading unit 13, the BPDU receiving unit 14, the BPDU transmitting unit 15, the STP information management unit 16, the port status setting unit 17, the logical port storage unit 18 and the STP information storage unit 19. Next, the functions of the component parts 13 to 19 will be explained.

Assume that the rereading unit 13 receives the BPDU from the packet transmitter/receiver 12 and delivers the same BPDU to the BPDU receiving unit 14. In the case where the received BPDU is a packet from a mesh-connecting port 3 related to the logical port 10, the rereading unit 13 rereads the particular BPDU to be the packet received from the logical port 10 related to the particular BPDU.

The BPDU receiving unit 14 receives the BPDU from the rereading unit 13, and delivers the receiving port number (the logical port number after rereading, if any) and the whole BPDU to the STP information management unit 16.

The BPDU transmitting unit 15, in response to the request of the STP information management unit 16, requests the packet transmitter/receiver 12 to send out the BPDU to the port 3 or 4.

In the process, assume that the destination is the logical port 10. The BPDU transmitting unit 15 requests the packet transmitter/receiver 12 to send out the BPDU having the same route path cost and the same port priority from all the mesh-connecting ports 3, 3, 3 related to the particular logical port 10.

The STP information management unit 16, based on the information received from the BPDU receiving unit 14, determines the STP status and stores the determined STP status in the STP information storage unit 19.

In any one of the cases (1) to (3) described below, the STP information management unit 16 requests the BPDU transmitting unit 15 to transmit the BPDU to the port of the destination port number in accordance with the spanning tree protocol.

(1) In the case where the STP status is changed.

(2) In the case where the local bridge is a root bridge and a regular hello package is transmitted by driving a timer.

(3) In the case where the local bridge is not a root bridge, and a hello packet is received and transmitted to other than the root bridge.

The port status setting unit 17 sets in the ports 3, 3, 3, 4 the STP status determined by the STP information management unit 16.

In the process of setting the STP status in a logical port, the port status setting unit 17 searches the logical port storage unit 18 and accesses the numbers (physical numbers) of the mesh-connecting ports related to the particular logical port, and thus sets to the same STP status all the mesh-connecting ports 3, 3, 3 related to the particular logical port 10.

The logical port storage unit 18 has stored therein, as a table shown in FIG. 19, for example, the number of the logical port 10 and the numbers (physical numbers) 1, 2, 3 of the plurality of the mesh-connecting ports 3, 3, 3 related to the logical port 10.

A plurality of logical ports including the two logical ports 10, 11 shown in the table of FIG. 19 may be included in the mesh network bridge 2.

In the case where the mesh network bridge according to the invention is used in the mesh network shown in FIG. 4, only one logical port is sufficient. For the mesh network bridges 2a, 2c used at the position where two mesh networks are connected as shown in FIG. 21, however, two logical ports 10, 11 as shown in the table of FIG. 19 are required.

Different mesh-connecting port numbers (physical numbers) 1, 2, 3 and 7, 8, 9 are designated as the numbers related to each of the logical ports 10, 11.

Only one logical port, not a plurality of logical ports, is related to one mesh-connecting port.

The optimized forwarding process with a plurality of logical ports is carried out as follows, taking the mesh network bridge 2c of FIG. 21 having two logical ports as an example.

The packet received from a mesh-connecting port connected to the mesh network 1a is regarded by the bridge 2c to have been received from the logical port related to the particular mesh-connecting port, and is not sent out to the other mesh-connecting ports related to the particular logical port (i.e. the mesh-connecting ports connected to the mesh network 1a), but to all the mesh-connecting ports related to the other logical port (i.e. the mesh-connecting ports connected to the mesh network 1b).

The optimized forwarding process is executed in this manner in the presence of a plurality of logical ports.

FIG. 21 shows a case in which the bridge 2a and the bridge 2c are interconnected by the mesh networks 1a, 1b.

In this case, the optimized forwarding conducted in simplistic fashion as described above would cause a loop between the bridge 2a and the bridge 2c.

Even in such a case, however, according to the invention, no loop is formed since the spanning tree protocol is used for the two logical ports and a blocked port is set for one of the bridges.

In the case where the mesh-connecting port connected to the mesh network 1a of the bridge 2c is set as a blocked port BP, for example, the data from the bridge 2c to the bridge 2b are sent through bridge 2a equivalently to a network configuration having a redundant route.

Returning to FIG. 1, the STP information storage unit 19 has stored therein, as a table shown in FIG. 20, the port status and the information on the last-received BPDU for each port number.

According to this embodiment, the output BPDU are also processed as an output of a single logical port, and the same logical port number is assigned to the port numbers (port ID in BPDU) of all the mesh-connecting ports.

The destination mesh network bridge which receives the output BPDU, however, ignores the port numbers in the BPDU, and therefore the same port number is not necessarily assigned.

Next, the format structure of the BPDU sent out for avoiding a loop outside the mesh domain will be explained with reference to FIGS. 6A to 6D.

Figure 6A:
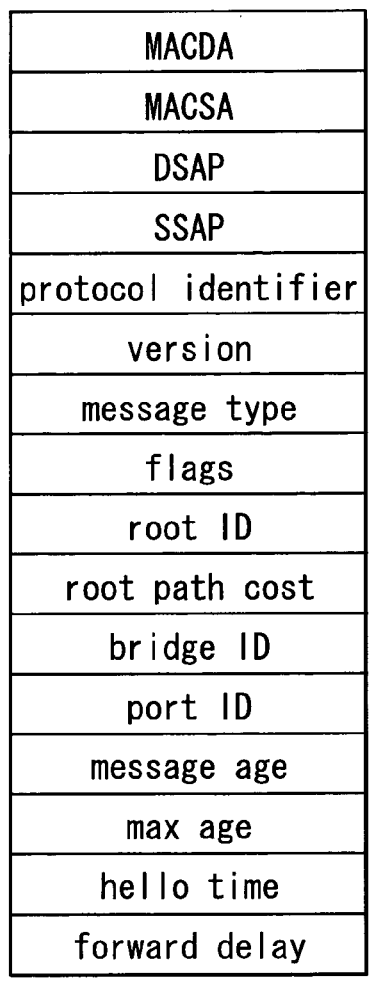
FIG. 6A is a diagram showing a format of the BPDU proper in the frame format of the BPDU sent out in FIG. 4.

FIG. 6A is a diagram showing a frame format of the BPDU proper.

Figure 6B:
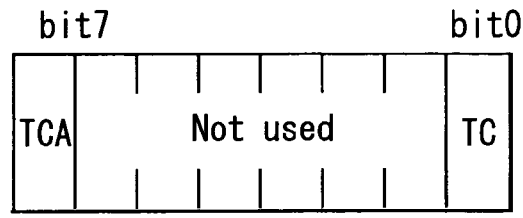
FIG. 6B is a diagram showing a format of the flags included in the BPDU sent out in FIG. 4.

FIG. 6B is a diagram showing a frame format of the flags included in the data of BPDU.

Figure 6C:
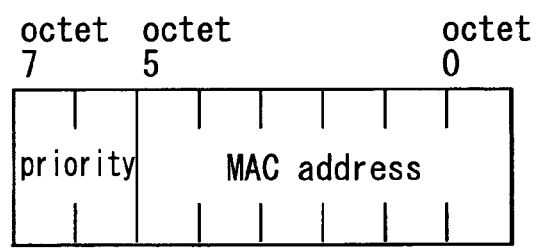
FIG. 6C is a diagram showing a format of the root ID and the bridge ID included in the BPDU sent out in FIG. 4.

FIG. 6C is a diagram showing a frame format of the root ID and the bridge ID included in the data of the BPDU.

Figure 6D:
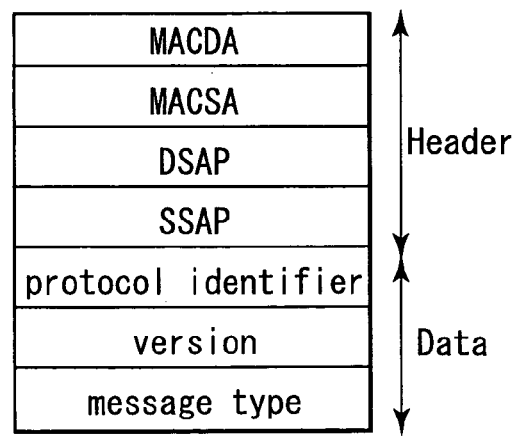
FIG. 6D is a diagram showing a format of the TCN-BPDU included in the BPDU sent out in FIG. 4.

FIG. 6D is a diagram showing a frame format of the TCN-BPDU transmitted upon detection of a change in STP status.

As shown in FIG. 6A, BPDU is configured of a header section and a data section.

As shown in FIG. 6B, the flags include a TCA flag, an unoccupied flag and a TC flag.

The bridge that has received from the root port the BPDU with the TCA bit on stops transmitting TCN-BPDU to the root port.

The bridge that has received from the root port BPDU with the TC bit on, until the receipt of the BPDU with the TC flag not on, sets the time-out value of the forwarding table aging timer in the forwarding table 20 at the value of forward delay and the local bridge also transmits the BPDU with the TC flag on.

As shown in FIG. 6C, the root ID and the bridge ID have the most significant two octets representing the priority set by the network manager, and the least significant 6 octet representing the MAC address of the bridge.

In the root ID and the bridge ID, the priority of the most significant 2 octets set by the network manager is given priority, and the degree of significance of each bridge is determined by the magnitude of the whole frame including the MAC address.

In the case where the most significant 2 octets of the root ID of BPDU of each bridge are set in default state, for example, the bridge with the smallest MAC address of the root ID functions as a root bridge.

Also, the root path cost is the cost of the path (considered) shortest to the root bridge.

In the port ID, the most significant one octet represents the priority set by the network manager and the least significant one octet is an ID unique to the bridge.

This port ID is ignored at the time of receiving in the mesh connection, and therefore the least significant one octet of the port ID is not required to be set. The same port ID is used for all the mesh-connecting ports 3 related to the same logical port according to this embodiment.

The "message age" indicates the time elapsed from the root bridge in units of $1/256$ seconds.

The value of the elapsed time of 256, for example, indicates that the root bridge transmitted a BPDU corresponding to the prevailing BPDU one second ago.

Also, the "max age" represents the effective time of BPDU in units of $1/256$ seconds.

The "hello time" represents the time interval at which the root bridge transmits the BPDU as expressed in units of $1/256$ seconds.

In other words, the root bridge transmits BPDU at intervals of the "hello time".

The "forward delay" indicates a parameter, in units of $1/256$ seconds, used for the listening period, the learning period and the learning table aging timer in the case of restructuring, if any, of the spanning tree.

A topology change timer is for measuring the period during which the TC flag shown in FIG. 6D is set.

In the case where a logical port is blocked in the mesh domain, the STP processing unit 5 blocks all but not a part of the mesh-connecting ports 3 related to the same logical port of the particular mesh network bridge 2.

In this way, the conflict is avoided between the spanning tree protocol and the optimized forwarding in the mesh network bridge 2.

The logical port number of the logical port attached to the port ID of BPDU may be either different from the number of a physical port (a mesh-connecting port 3 actually connected to the mesh network bridge 2) or a pilot number of the mesh-connecting ports (physical ports).

Next, the operation of BPDU transmission will be explained with reference to the flowchart of FIG. 7.

In FIG. 7, character X designates a variable for realizing a processing loop to send the BPDU to all the ports. The value X is incremented from 1 to 2 to 3 and so on up to MAXPORT around a loop.

According to this embodiment, to simplify the processing, assume that the number of the ports packaged is n. The subsequent variables n+1, n+2, . . . , MAXPORT constitute the logical port numbers.

Thus, MAXPORT is the sum of the number of the ports and the number of the logical ports packaged on the mesh network bridge 2.

Character N designates a variable for realizing a processing loop while searching for a mesh-connecting port to send the same BPDU to all the mesh-connecting ports.

In this BPDU transmitting process, the BPDU transmitting unit 15 first sets X to 1 (step ST1) and determines whether X≦MAXPORT (maximum port) or not (step ST2).

In the case where it is determined that X is not smaller than or equal to MAXPORT (NO in step ST2), i.e. in the case where it is determined that the maximum port is exceeded, the process is terminated.

In the case where it is determined that X is smaller than or equal to MAXPORT (YES in step ST2), on the other hand, it is determined whether X is a logical port or not (step ST3).

In the case where X is a logical port, it is determined whether all the mesh-connecting ports 3 related to the logical port are combined as a single port or not.

In the case where it is determined that X is not a logical port (NO in step ST3), on the other hand, it is determined whether X is a mesh-connecting port or not (step ST4).

In the case where it is determined that X is not a mesh-connecting port (NO in step ST4), the BPDU for the port X (non-mesh-connecting port number) is transmitted to the port (step ST5) on the one hand, and while incrementing X to X+1 (step ST6), after which the process returns to step ST2.

In the case where it is determined that X is a mesh-connecting port (YES in step ST4), on the other hand, the prevailing transmitting process is executed as the process for transmission to the logical port. Therefore, the process proceeds to step ST6 without any transmitting process.

In the case where it is determined in step ST3 that X is a logical port (YES in step ST3), N is set to 1 (step ST7), and it is determined whether N≦MAXPORT (maximum number of ports) or not (step ST8).

In the case where it is determined that N is not smaller than or equal to MAXPORT (NO in step ST8), the process proceeds to step ST6.

In the case where it is determined that N is smaller than or equal to MAXPORT (YES in step ST8), on the other hand, it is determined whether the port number N represents a mesh-connecting port related to the logical port X (step ST9).

In the case where it is determined that the port number N represents a mesh-connecting port related to the logical port X (YES in step ST9), the BPDU for the port X (logical port number) is transmitted to the port number N (step ST10).

After N is incremented to N+1 (step ST11), the process returns to step ST8.

In the case where it is determined that the port number N does not represent a mesh-connecting port related to the logical port (NO in step ST9), on the other hand, the process proceeds to step ST11.

Next, the operation of the BPDU receiving process will be explained with reference to the flowchart of FIG. 8.

In the BPDU receiving process, first upon receipt of a packet by the packet receiving unit 12 (step ST21), it is determined whether the particular packet is BPDU or not (step ST22).

In the case where it is determined that the packet is not a BPDU (NO in step ST22), the particular packet is forwarded as it is (step ST23).

In the case where it is determined that the packet is a BPDU (YES in step ST22), on the other hand, it is determined whether the receiving port is the mesh-connecting port 3 or not (step ST24).

In the case where it is determined that the receiving port is the mesh-connecting port 3 (YES in step ST24), the logical port number related to the receiving port number is used by the rereading unit 13 (step ST25).

In the case where it is determined that the receiving port is not the mesh-connecting port 3 (NO in step ST24), on the other hand, the actual physical port number is used as the receiving port number (step ST26).

Once the number used for the receiving port is determined as described above, the BPDU receiving process is executed by the BPDU receiving unit 13 (step ST27). At the same time, the STP information is managed by the STP information management unit 18 (step ST28), and the STP status of the port is set by the port status setting unit 17 (step ST29).

As a result, the BPDU receiving process is executed according to the spanning tree protocol based on ANSI/IEEE Std. 802.1D described above.

In the case where the port status for the logical port is set in step ST29, the same STP status is set in all the mesh-connecting ports related to the same logical port.

As shown in FIG. 9A, assume that the bridge 6f and the bridge 6g (none of which is a mesh network bridge 2) are connected between the bridge 2a and the bridge 2c as a backup route (external network). A loop is formed by the bridge 2a, the bridge 2c, the bridge 6f and the bridge 6g.

With the mesh network bridge 2 according to this embodiment, however, the BPDU received from the mesh-connecting port 3 is regarded to have been received from the related logical port, so that the STP status is determined based on the received BPDU.

As a result, the spanning tree protocol, as shown in FIG. 9B, recognizes that a plurality of (four bridges 2a to 2d in the case of FIG. 9B) the mesh network bridges are connected to a single-bus LAN.

Then, the blocking port is set based on the received BPDU.

In the case of FIG. 9B, the port on the side of bridge 6g is set as the blocking port BP between the bridge 6f and the bridge 6g.

As described above, the mesh network bridge 2 according to this embodiment regards all the mesh-connecting ports 3 as a single port logically, and sends out the same BPDU to all the mesh-connecting ports 3.

Also, the mesh network bridge 2 according to this embodiment regards the BPDU received from all the mesh-connecting ports 3 to have been received from a single related logical port. Based on the received BPDU, the mesh network bridge 2 determines the STP status, and stores the STP information in the STP information storage unit 19.

As a result, the mesh network bridge 2 according to this embodiment recognizes that a plurality of mesh network bridges 2 are connected to a single-bus LAN by the spanning tree protocol, and a blocking port is set based on the received BPDU. Thus, a loop between the mesh domain and the outside of the mesh domain can be avoided.

Further, in the mesh network bridge 2 according to this embodiment, as long as no line fault occurs between the mesh network bridges in the mesh domain, communication can be established along the shortest path between the mesh network bridges.

In the mesh network bridge 2 according to this embodiment, therefore, the delay due to the detour of the route and the excessive load on a part of the devices are reduced for an improved line utilization rate.

The embodiments are explained above as a case in which there is only one line for connecting the mesh network bridges 2, 2 making up the mesh network 1. Nevertheless, a configuration may be employed in which the mesh network bridges 2, 2 are connected by two or more lines.

In the case where a plurality of the lines between the mesh network bridges connected in opposed relationship to each other are related to the same logical port, as shown in FIG. 22, the plurality of the lines are required to be bundled by link aggregation (IEEE Std 802.3).

In the case where the plurality of the lines are bundled by link aggregation, a plurality of the lines between the mesh network bridges connected in opposed relationship to each other are regarded as a single port.

In such a case, the particular single port is related to one logical port according to the invention (FIG. 22).

Second Embodiment

The optimized forwarding used as a shortest path constructing means according to the first embodiment described above presupposes the usability of a transmission line in the mesh domain. Upon occurrence of a line fault, therefore, communication is stopped and it becomes impossible to reach the bridges connected to the particular line.

In view of this, the mesh network 1 employing the mesh network bridges 2 according to a second embodiment of the invention is equipped with a backup function in which a mesh network bridge 2 having detected a line fault continues to remain in the mesh domain, and even in the optimized forwarding environment, a packet is caused to reach the otherwise unreachable bridge through other mesh network bridges 2 connected to the seemingly unreachable mesh network bridge 2.

Figure 2:
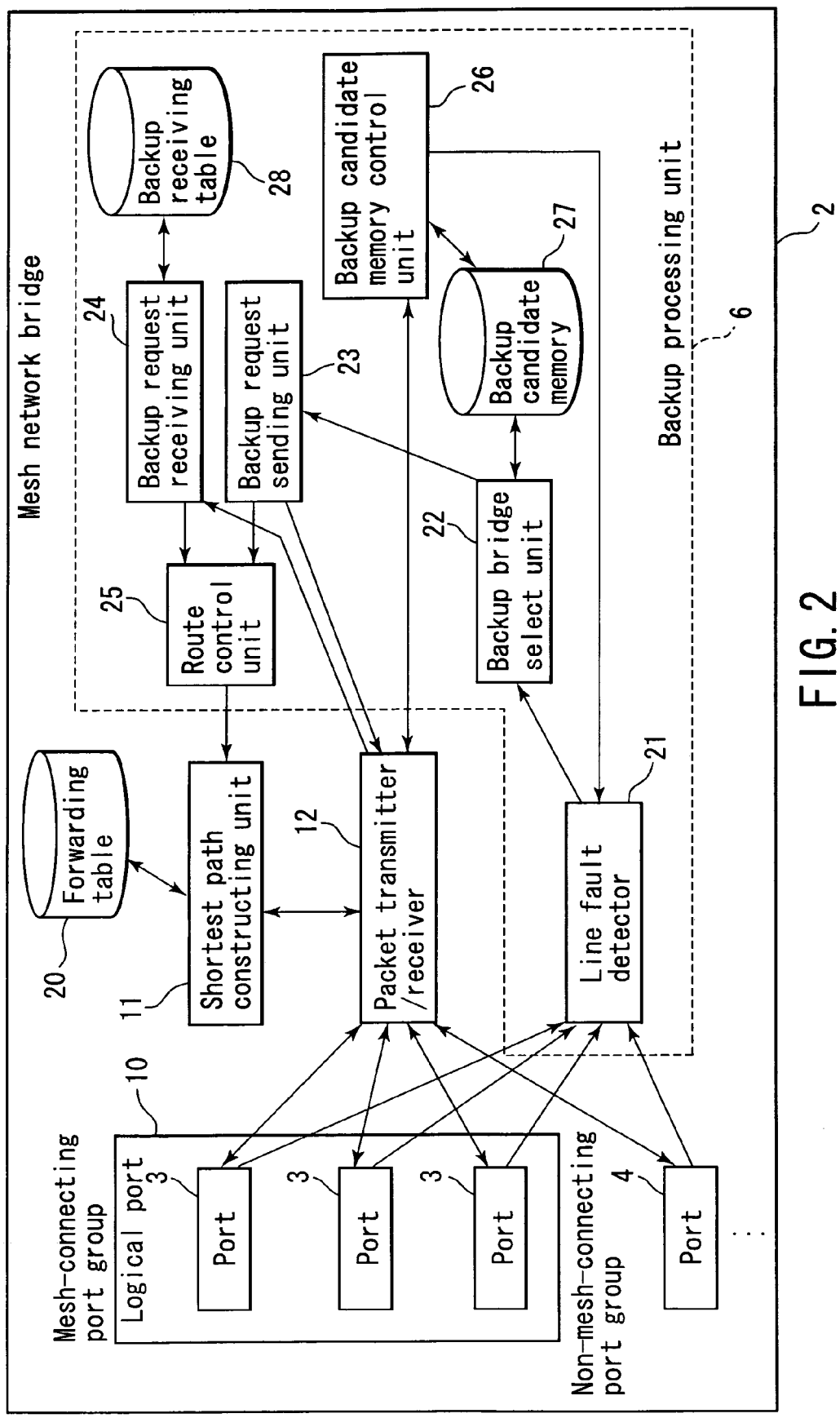
FIG. 2 is a block diagram showing a general configuration of a mesh network bridge according to a second embodiment of the invention.

FIG. 2 is a block diagram showing a general configuration of a mesh network bridge according to the second embodiment of the invention.

FIGS. 10 and 11 are diagrams for explaining a case in which a route is formed in response to a backup request in the mesh network employing mesh network bridges according to the second embodiment of the invention.

FIG. 12 is a diagram showing an example of a backup candidate memory included in the mesh network bridge according to the second embodiment of the invention.

FIG. 13 is a diagram showing an example of a backup receiving table included in the mesh network bridge according to the second embodiment of the invention.

FIG. 14 is a diagram showing a format of a mesh control packet used in the mesh network bridge according to the second embodiment of the invention.

FIG. 15 is a diagram showing a format the option for neighbor notification in the format of FIG. 14.

FIG. 16 is a diagram showing a format of the "option" for requesting/canceling the backup in the format of FIG. 14.

Figure 17:
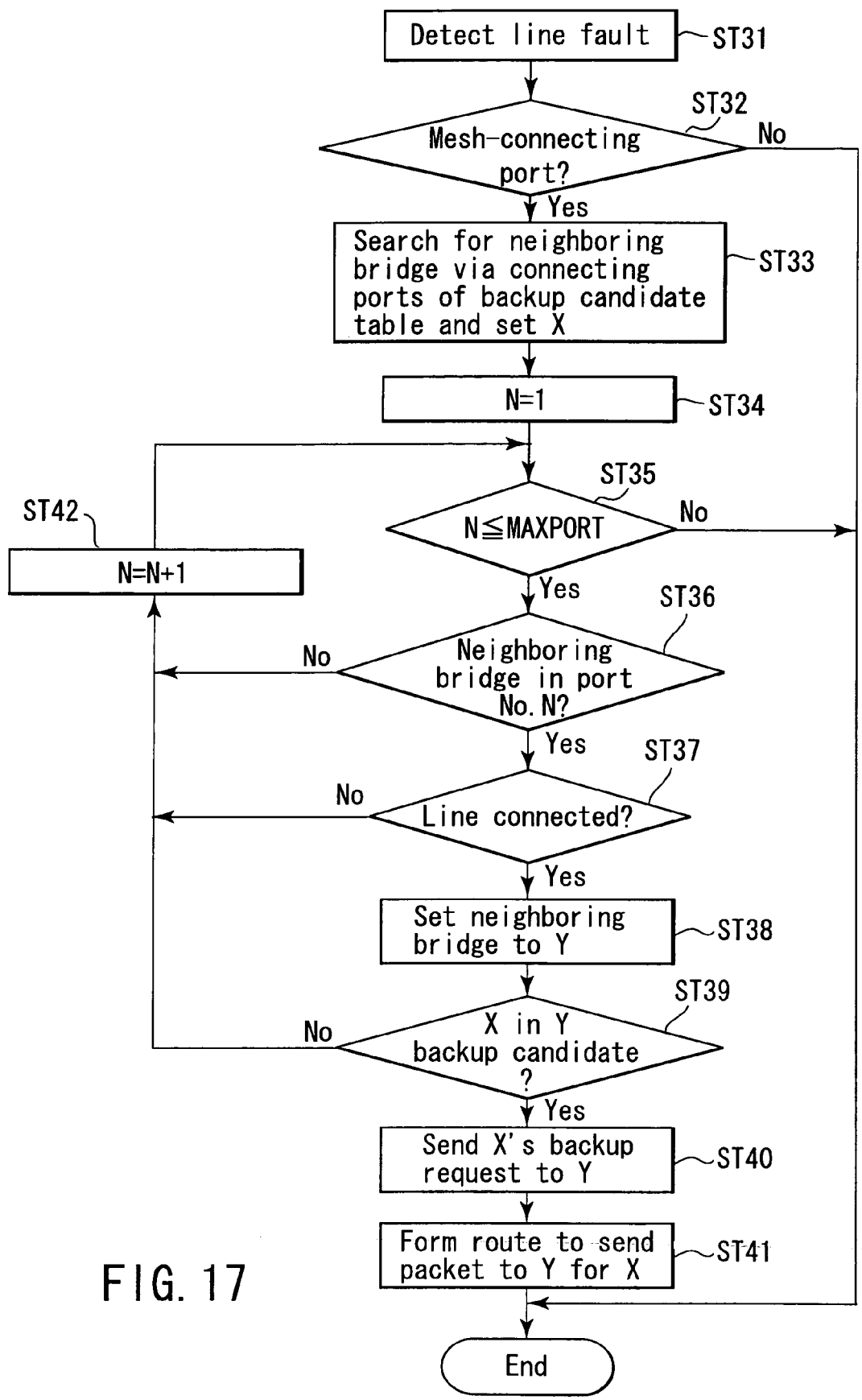
FIG. 17 is a flowchart for explaining the backup request process executed at the time of line fault detection in a mesh network employing the mesh network bridge according to the invention.

FIG. 17 is a flowchart for explaining the backup request process upon detection of a line fault of the mesh network bridge according to the second embodiment of the invention.

Figure 18:
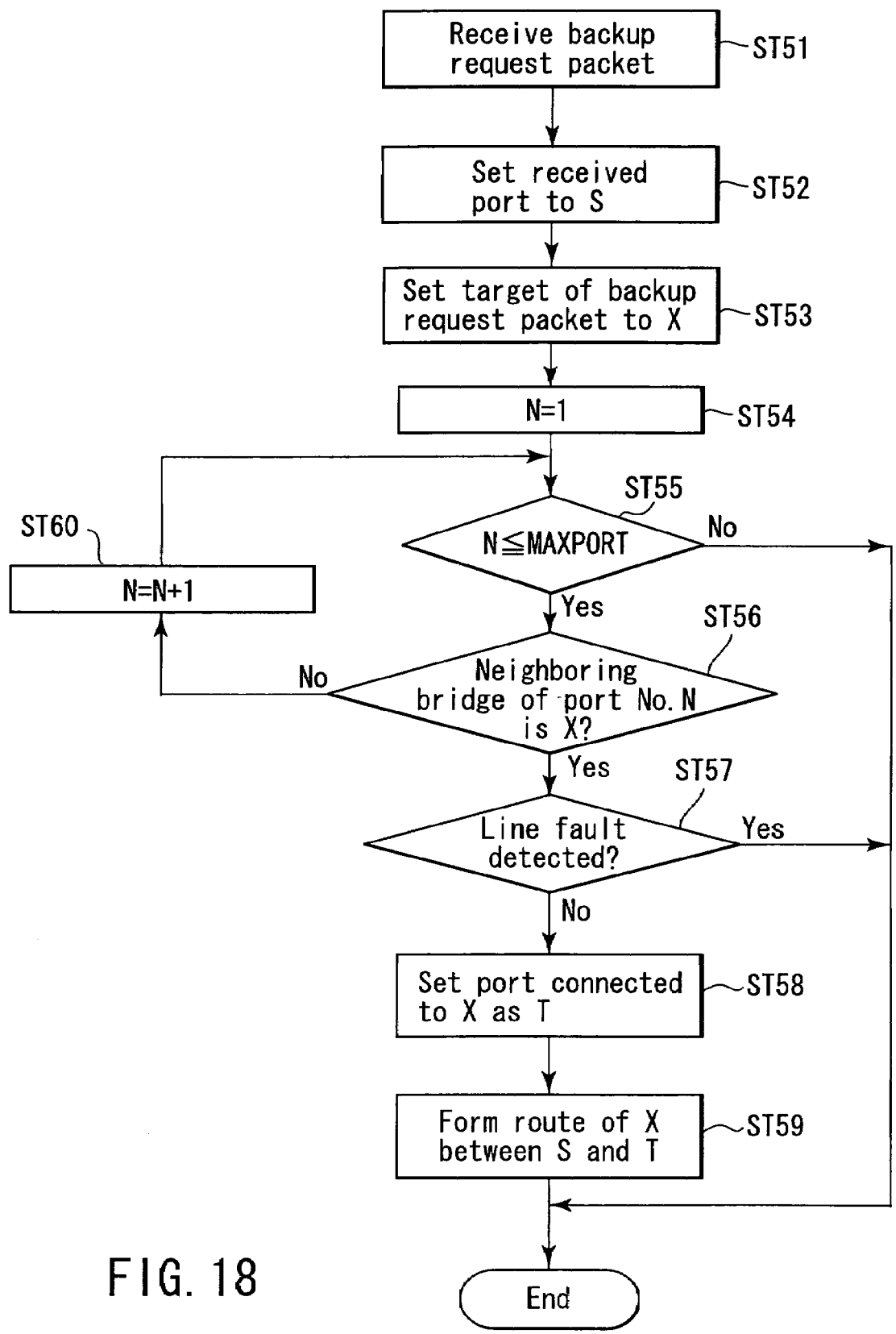
FIG. 18 is a flowchart for explaining the backup receiving process in a mesh network employing the mesh network bridge according to the invention.

FIG. 18 is a flowchart for explaining the backup receiving process for the mesh network bridge according to the second embodiment of the invention.

First, a general configuration of the mesh network bridge according to the second embodiment of the invention will be explained with reference to FIG. 2.

In FIG. 2, the same component parts as those in the first embodiment are not explained below. According to the second embodiment, however, the internal operation of the packet transmitter/receiver 12 is as follows.

Specifically, the packet transmitter/receiver 12 delivers a received backup request packet to the backup request receiving unit 24 on the one hand and sends out to a designated port the backup request packet received from the backup request sending unit 23 on the other hand.

The line fault detection unit 21 is for detecting a line fault between the local port (the mesh-connecting port 3 or the non-mesh-connecting port 14) and another port connected to the local port. Upon detection of an event of a line fault such as the link down through a port, for example, the line fault detection unit 21 notifies the particular line fault event to the backup bridge select unit 22.

Various methods for detecting a line fault are available. In a keep-alive method in which a neighboring bridge notification packet prepared as a kind of a mesh control packet (described later) is exchanged between the mesh network bridges 2, 2 so that a line fault is detected according to whether the neighboring bridge notification packet reaches the mating bridge within a predetermined time or not. In another method called the link-down method, a line fault is detected by an interrupt signal generated in the case of disconnection between the ports of the normally operatively conducted mesh network bridges 2, 2. Still another method consists in detecting a line fault by the fact that the packets normally exchanged regularly fail to arrive within a predetermined time.

The backup bridge select unit 22, upon receipt of the port number where a line fault has occurred from the line fault detecting unit 21 on the assumption that the particular port is a mesh-connecting port 3, finds neighboring bridges (unreachable bridges) connected to the notified port number from the backup candidate memory 27, selects a neighboring bridge, as a requested bridge, having the particular unreachable bridge as a backup candidate, and notifies the particular neighboring bridge to the backup request sending unit 23.

In order to indicate the occurrence of a line fault to the connected port notified of the line fault, the remaining monitor time of the particular connected port in the backup candidate memory 27 is rewritten as zero.

The backup request sending unit 23, upon receipt of the notification of the unreachable bridge and the requested bridge from the backup bridge select unit 22, requests the packet transmitter/receiver 12 to transmit a backup request packet to the requested bridge with the backup target as an unreachable bridge and the backup source as the local bridge, and then upon receipt of a packet with a destination as an unreachable bridge, requests the route control unit 25 to form a route to send out packets to the requested bridge but not to the particular unreachable bridge.

The backup request receiving unit 24, upon receipt of a backup requesting packet from other bridges through the packet transmitter/receiver 12, registers in the backup receiving table 28 the connected port that has received the packet, the backup target (unreachable bridge) and the backup source (requesting bridge) indicated by the packet and the remaining monitor time. Then, the backup request receiving unit 24, upon receipt of a packet from the backup source with the backup target as the destination, requests the route control unit 25 to form a route for sending out the packet to the backup target.

In the case where the combination of the backup source and the backup target indicated by the received backup request packet is already stored in the backup receiving table 28, the backup request receiving unit 24 sets the remaining monitor time to the initial value.

The backup request receiving unit 24 regularly monitors the remaining monitor time, and upon expiry of the remaining monitor time or upon receipt of a backup cancel request from the packet transmitter/receiver 12, deletes the items of the particular backup route (the backup source, the backup target and the remaining monitor time) from the backup receiving table 28, while at the same time requesting the route control unit 25 to cancel the backup route already formed.

The route control unit 25, upon receipt of a request to form a backup route from the backup request sending unit 23 or the backup request receiving unit 24, requests the shortest path constructing unit 11 to form the backup route as an exceptional process for the optimized forwarding.

Also, the route control unit 25, upon receipt of a request to cancel the backup route through the backup request receiving unit 24, requests the shortest path constructing unit 11 to stop the exceptional process for the designated backup route.

The backup candidate memory control unit 26 regularly sends out, through the packet transmitter/receiver 12, to the bridges connected by line with the mesh-connecting ports 3, 3, 3 a neighbor notification packet containing the information on the presence of the local bridge and other bridges (neighboring bridges) connected by mesh to the local bridge.

The backup candidate memory control unit 26, upon receipt of the neighbor notification packet through the packet transmitter/receiver 12, retrieves the receiving port number, the source address and the neighboring bridge information from the particular packet, and stores in the backup candidate memory 27, the receiving port as a connected port in the backup candidate table, the source address as a neighboring bridge in the table and the neighboring bridge as a backup candidate in the table, together with the remaining monitor time for detecting a line fault.

Also, the backup candidate memory control unit 26 regularly monitors the remaining monitor time stored in the backup candidate memory 27, and upon detection of the absence of the neighbor notification packet for a predetermined length of time, notifies the line fault detection unit 21 that a line fault has occurred.

The backup candidate memory 27 has stored therein the backup candidate table described above.

The backup candidates for the connected ports and the neighboring bridges and the remaining monitor time are adapted to be written in the backup candidate table as shown in FIG. 12.

The operation of writing into the backup candidate memory 27 is not explained as it is already explained with the backup bridge select unit 22 and the backup candidate memory control unit 26.

Next, an explanation will be given about the operation of forming a backup route upon detection of a line fault in the mesh network 1 employing the mesh network bridge 2 according to this embodiment.

The mesh network bridge 2 according to this embodiment includes a backup (route forming) protocol which is a kind of signaling protocol for forming, upon detection of a line fault with other mesh network bridges 2 in the mesh network 1, a detour (backup route) to another reachable mesh network bridge 2 instead of to the mesh network bridge 2 that has become unreachable.

For the backup request by the backup (route forming) protocol providing a kind of the signaling protocol, the process described below is executed.

First, the neighbor notification packet prepared as a kind of the mesh control packet as shown in FIG. 14 is exchanged between the mesh network bridges 2, 2 (FIG. 10).

The notification with this neighbor notification packet is given to all the mesh network bridges 2 at intervals of predetermined time (for example, 2 seconds).

The mesh network bridge 2 that has received the neighbor notification packet recognizes the presence of a mesh network bridge 2 that has sent the neighbor notification packet and the availability of the line with the particular mesh network bridge 2.

The mesh network bridge 2, on the other hand, detects the occurrence of a line fault with a mesh network bridge 2 unless the notification with the neighbor notification packet is reached from the particular mesh network bridge 2 within a predetermined time length (for example, eight seconds).

The neighbor notification packet has stored therein the bridge IDs (MAC addresses) of other mesh network bridges 2 in the neighborhood of the local bridge 2.

As a result, the mesh network bridge 2 that has received the neighbor notification packet can manage the backup candidate table containing the information on the backup requestee in the case where the mesh network bridge 2 that has transmitted the neighbor notification packet becomes unreachable.

The mesh network bridge 2 that has detected a line fault finds from the backup candidate table a mesh network bridge 2 capable of backing up the unreachable bridge and issues a backup request to the particular mesh network bridge 2.

As shown in FIG. 11, for example, assuming that a line fault occurs between the bridge 2c and the bridge 2d, a backup request is issued from the bridge 2c to the bridge 2a.

This backup request is issued by sending out to the bridge 2a a backup request packet designating the MAC addresses of the unreachable bridge and the local bridge as a "backup target" and a "backup source".

The mesh network bridge 2a that has received the backup request forms a backup route by flooding and multicast distribution to the ports connected with the "backup target" and the ports connected with the "backup source".

According to this embodiment, in order to designate a line requiring backup, the MAC address of the unreachable bridge is used as ID information capable of identifying the unreachable bridge. As an alternative method, a backup request is issued by setting a line number designating a backup line in advance and by designating the particular line number.

The backup candidate table used to form a backup route will be described with reference to FIG. 12.

As many backup candidate tables as the mesh-connecting ports 3 are prepared in the backup candidate memory 27.

FIG. 12 shows an example in which four mesh-connecting ports 3 are involved.

The backup candidate table, upon receipt of the neighbor notification packet from a mesh-connecting port 3, has registered therein a mesh network bridge 2 connected to the particular mesh-connecting port as a neighboring bridge and a neighboring bridge in the neighbor notification packet as a backup candidate.

The backup candidate memory control unit 26 initializes the remaining monitor time stored in the backup candidate memory 27 to 10 (corresponding to ten seconds, for example).

The remaining monitor time is reduced every second and initialized again to 10 upon receipt of a neighbor notification packet by the mesh-connecting port 3.

Once the remaining monitor time is reduced to zero, i.e. in the case where the neighbor notification packet fails to arrive within ten seconds, it indicates the occurrence of a line fault in the connected port 3.

Next, the backup receiving table 28 shown in FIG. 13 will be explained.

The backup receiving table 28, upon receipt of a backup request by a mesh network bridge 2, has recorded therein the information on the connected port that has received the backup request, a backup target and a backup source and the remaining monitor time.

The backup request receiving unit 24 requests the route control unit 25 to form a route for flooding and multicasting the packets between a port connected with the backup source and a port connected with the backup target.

The backup request arrives at predetermined time intervals (for example, two seconds), and therefore the remaining monitor time is initialized to ten each time of the arrival.

The backup request receiving unit 24, upon receipt of a backup cancel packet through the packet transmitter/receiver 12 or upon reduction of the remaining monitor time to zero, deletes the particular entry and instructs the route control unit 25 to stop the flooding and multicast forwarding of the packets between a port connected with the backup source and a port connected with the backup target.

Next, a mesh control packet containing the neighbor notification packet and the backup request packet described above will be explained with reference to FIG. 14.

This mesh control packet, as shown in FIG. 14, is configured of a destination source (6 bytes), a source address (6 bytes), a packet length (2 bytes), an LLC DSAP (1 byte), an LLC SSAP (1 byte), an LLC control (1 byte), a protocol ID (2 bytes), a protocol version (1 byte), a command (1 byte), an option (0 to 9 bytes), a padding and an FCS (4 bytes).

Common terms of the mesh control packet are not explained, and the "command" and the "option" newly prepared in this invention will be explained below.

According to this invention, the following command codes are assigned as a "command" of the mesh control packet.

0x00 . . . Neighbor notification
0x01 . . . Backup request
0x02 . . . Backup cancel The "option" is varied from one command to another and defined as follows.

With the neighbor notification, a neighboring bridge list is stored in the "option".

The format of the option field is configured as shown in FIG. 15, for example.

With the number of neighboring bridges set a 0 to 15 (maximum), for example, the neighbor notification is given every two seconds. In this way, the mesh network bridge 2 accesses the backup candidate table of itself and sends out a list of the neighboring bridges to all the mesh-connecting ports 3.

In the backup request and cancel process, as shown in FIG. 16, the backup target and the backup source are stored in the "option".

The backup request is output from the backup request sending unit 23 through the transmitter/receiver 12 to the backup candidate bridges selected from the backup candidate memory 27 by the backup bridge select unit 22.

The backup request receiving unit 24, on the other hand, upon receipt of the neighbor notification packet through the packet transmitter/receiver 12 from the mesh network bridge 2 that has requested the backup, checks the particular packet whether it contains the backup target as a neighbor, and in the absence of a neighboring backup target, sends a backup cancel signal through the route control unit 25, while at the same time selecting another candidate bridge and sending a backup request again.

This backup request lacks a response, and therefore the backup request receiving unit 23 sends a backup request each time the neighbor notification packet is received.

The mesh network bridge 2 that has received the backup request records it in the backup receiving table 28 while at the same time starting the forwarding between the backup target and the backup source through the route control unit 25.

In the case where the backup request fails to arrive within ten seconds, the backup process is stopped and the previous record is deleted from the backup receiving table 28.

In this way, a backup route is formed by the backup (route forming) protocol providing a kind of the signaling protocol.

Next, the backup request process upon detection of a line fault will be explained with reference to the flowchart of FIG. 17.

In this backup request process, upon detection of a line fault by the line fault unit 21 (step ST31), it is determined whether the port associated with the detected line fault is a mesh-connecting port 3 or not (step ST32).

In the case where it is determined that the port associated with the detected line fault is not a mesh-connecting port 3 (NO in step ST32), the process is terminated.

In the case where it is determined that the port associated with the line fault detected by the line fault unit 21 is a mesh-connecting port 3 (YES in step ST32), on the other hand, the backup bridge select unit 22 searches the backup candidate table in the backup candidate memory 27.

As a result, the address X of the neighboring bridge (unreachable bridge) is determined from the port associated with the detected line fault (step ST33).

In the process, in order to indicate the port associated with the detected line fault, the remaining monitor time is set to zero.

Next, a backup candidate is selected. Character N designates a variable incremented from 1, 2, 3 up to MAXPORT to search all the mesh-connecting ports registered in the backup candidate table. First, N is set to 1 (step ST34).

Next, it is determined whether N is not larger than the number of the mesh-connecting ports (step ST35). In the case where N exceeds the number of mesh-connecting ports (NO in step ST35), the process is terminated.

In the case where N is not larger than the number of mesh-connecting ports (YES in step ST35), on the other hand, it is determined whether the port number N has a neighboring bridge or not (step ST36).

In the case where the port number N has no neighboring bridge (NO in step ST36), N is incremented to N+1 (step ST42), after which the process proceeds to step ST35.

In the case where the port number N has a neighboring bridge (YES in step ST36), on the other hand, it is determined whether the particular neighboring bridge is connected by line or not (step ST37).

In the process, in order to check for a line fault, the remaining monitor time is confirmed to be not zero.

In the case where it is determined in step ST37 that the neighboring bridge is not connected by line (NO in step ST37), N is incremented to N+1 (step ST42) and the process is returned to step ST35.

In the case where the neighboring bridge is connected by line (YES in step ST37), on the other hand, the address of the neighboring bridge is set as a backup candidate address Y (step ST38).

Then, the backup candidates of port number N are searched whether they include an unreachable bridge X or not (step ST39).

In the absence of an unreachable bridge X in the backup candidates (NO in step ST39), N is incremented to N+1 (step ST42), after which the process is returned to step ST35.

In the presence of an unreachable bridge X in the backup candidates in step ST39 (YES in step ST39), on the other hand, the line connected between the bridge Y and the bridge X makes it possible to request the bridge Y to back up the bridge X (step ST40), and after a route is formed to send a packet to the bridge Y instead of to the bridge X (step ST41), the process is terminated.

Specifically, in the backup request process described above, upon detection of a line fault, the particular port is checked whether it is a mesh-connecting port 3 or not by reference to the backup candidate table.

In the case where the particular port is a mesh-connecting port 3, the address (X) of the bridge neighboring to the particular port is retrieved for connection to the address (X). In other words, the backup candidate table is checked again to make sure whether there is a line-connecting neighboring bridge 5 having X as a backup candidate.

In the case where a neighboring bridge is found which is connected by line with both the local bridge and the unreachable bridge X, the particular neighboring bridge is designated as a requestee bridge (Y)

Once the requestee bridge is found, the MAC address of the local bridge is regarded as a backup source, and the address (X) of the unreachable bridge is transmitted to the requestee bridge (Y) as a backup target.

Next, the process of receiving a backup request will be explained with reference to the flowchart of FIG. 18.

In the backup request receiving process, a backup request packet is received (step ST51) and the port that has received the request packet is designated as S (step ST52), and the target bridge for the backup request packet as X (step ST53).

Then, in order to select the mesh-connecting port of the target bridge, the port search variable N is set to 1 (step ST54).

It is determined whether the port search variable N is not larger than the number of the mesh-connecting ports (step ST55), and in the case where the port search variable N exceeds the number of the mesh-connecting ports (NO in step ST55), the process is terminated.

In the case where the port search variable N is not larger than the number of the mesh-connecting ports (YES in step ST55), on the other hand, it is determined whether the neighboring bridge of the port number N is X or not (step ST56).

In the case where the neighboring bridge of the port number N is not X (NO in step ST56), the port search variable N is incremented to N+1 (step ST60), and then the process proceeds to step ST55.

In the case where the neighboring bridge of the port number N is X (YES in step ST56), on the other hand, it is determined whether a line fault is detected or not (step ST57).

In the case where a line fault is detected by referring to the remaining monitor time (YES in step S57), the process is terminated.

In the case where no line fault is detected (NO in step ST57), on the other hand, the port connected to the target bridge is designated as T (step ST58).

Next, a route through which the packet otherwise to be sent to the bridge X from the port S is sent to the port T is formed (step ST59), and the process is terminated.

As described above, according to this embodiment, the mesh network bridge 2 that has detected a line fault finds out a neighboring mesh network bridge 2 of the unreachable bridge, and sends out to the neighboring mesh network bridge 2 a backup request packet with the MAC address of the unreachable bridge as a backup target and the MAC address of the local bridge as a backup source.

Also, according to this embodiment, the mesh network bridge 2 that has received the backup request packet forms a backup route by flooding and multicast distribution between the port connected to the backup target and the port connected to the backup source which are included in the backup request packet.

As a result, with the mesh network bridge 2 according to this embodiment, the route suffering from a line fault can be backed up.

Third Embodiment

Figure 3:
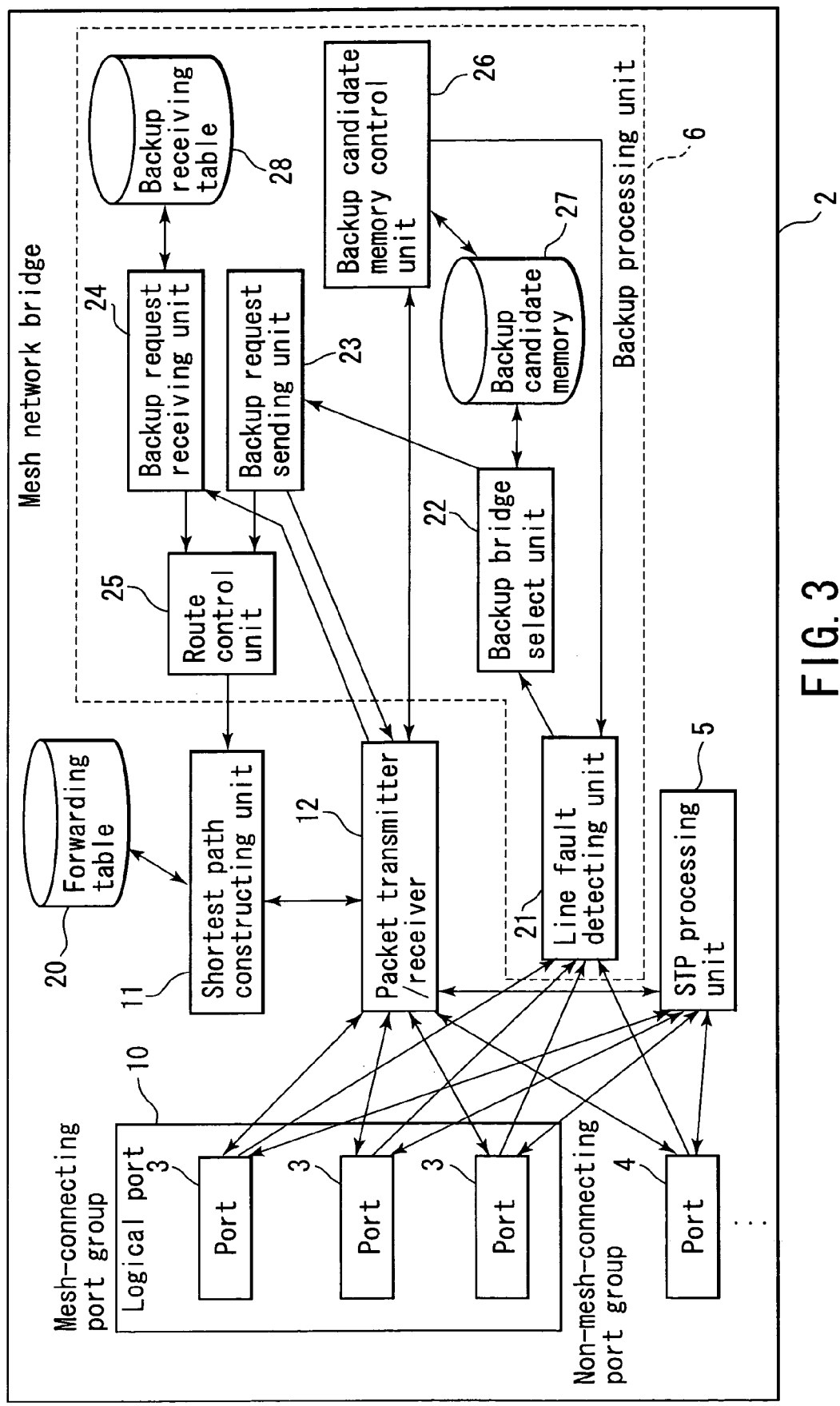
FIG. 3 is a block diagram showing a general configuration of a mesh network bridge according to a third embodiment of the invention representing a combination of the configurations of the first and second embodiments.

FIG. 3 is a block diagram showing a general configuration of a mesh network bridge according to a third embodiment in which the first and second embodiments are combined with each other.

In the third embodiment, the same component parts as those in the first and second embodiments are not described further.

According to the third embodiment, a mesh network bridge is realized having a dual feature that the optimized forwarding is used for a mesh network while at the same time using STP for the whole outside network connected to the mesh network as the function of the first embodiment on the one hand, and the optimized forwarding is used for the whole of a mesh network while at the same time making possible communication even in case of a line fault as the function of the second embodiment on the other hand.

As described above, the bridge according to the first embodiment of the invention is a mesh network bridge which uses the optimized forwarding for a mesh network while at the same time using STP for the whole outside network connected to the mesh network.

Also, the bridge according to the second embodiment of the invention is a mesh network bridge which uses the optimized forwarding for the mesh network as a whole and which is capable of communication even in case of a line fault.

According to the third embodiment, therefore, there is provided a mesh network bridge having the functions and features of the first and second embodiments combined.

As apparent from the foregoing description, according to this invention, communication is established between mesh network bridges through the shortest path, so that both the delay which otherwise might be caused due to the detour of the route and the excessive load on a part of the devices are reduced while at the same time improving the line utilization rate. Also, by relating a plurality of mesh-connecting ports to a single logic port, the spanning tree is constructed by the mesh domain and the outside of the mesh domain, thereby making it possible to avoid a loop in the outside of the mesh domain.

Further, according to this invention, upon detection of a line fault for a given mesh network bridge, a detour is formed through another mesh network bridge. In this way, the restoration from the suspension of communication is accelerated for an improved communication efficiency.

As described above, according to this invention, there is provided a mesh network bridge, wherein in order to avoid a loop by a mesh domain and the outside of the mesh domain using the optimized forwarding as a means for constructing the shortest path, the spanning tree protocol is used for the whole network including the mesh domain and the outside of the mesh domain, wherein the spanning tree is operable even in the optimized forwarding environment, so that both the delay which otherwise might be caused due to the detour of the communication route in the network and the excessive load on a part of the devices in the network are reduced while at the same time improving the line utilization rate, thereby improving the communication efficiency by avoiding a loop in the outside of the mesh domain.

Also, according to this invention, there is provided a mesh network bridge, wherein the backup protocol is operable in case of a line fault even in the optimized forwarding environment used as a means for constructing the shortest path, so that the route is changed immediately in case of a line fault and the restoration from the suspension of communication is accelerated to improve the communication efficiency.

Further, according to this invention, there is provided a mesh network bridge, wherein the spanning tree is operable even in the optimized forwarding environment used as a means for constructing the shortest path, so that both the delay which otherwise might be caused by the detour of the communication route in the network and the excessive load on a part of the devices in the network are reduced for an improved line utilization rate while at the same time improving the communication efficiency by avoiding a loop in the outside of the mesh domain, and wherein the backup protocol is operable in case of a line fault even in the optimized forwarding environment so that the route is immediately changed upon occurrence of a line fault and the suspension of communication is restored more quickly for an improved communication efficiency.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A mesh network bridge having a plurality of mesh-connecting ports to interconnect a plurality of bridges including an own bridge and other bridges as a mesh network, comprising:
   a packet transmitter/receiver which reciprocally transmits and receives packets between the plurality of bridges through the plurality of mesh-connecting ports;
   a shortest path constructing unit which constructs the shortest path between the plurality of bridges through the packet transmitter/receiver; and
   a STP processing unit which executes STP processing to activate a spanning tree protocol (STP) for attaching redundancy to the mesh network with the shortest path constructed between the plurality of bridges by the shortest path constructing unit;

wherein the STP processing unit comprises:
      a logic port storage unit which stores the plurality of mesh-connection ports and at least one logic port related to the plurality of mesh-connecting ports;
      a rereading unit which receives configuration bridge protocol data units (BPDU) of the other bridges from any one of the plurality of mesh-connecting ports through the packet transmitter/receiver, and rereads the BPDU as having been received from the logic port stored in the logic port storage unit;
      a BPDU receiving unit which receives the BPDU reread by the rereading unit as having been received from the logic port:
      a STP information management unit which determines an STP status of the logic port based on the BPDU received by the BPDU receiving unit;
      a STP information storage unit which receives and stores information on the STP status determined by the STP information management unit;
      a BPDU transmitting unit which transmits the BPDU to the other bridges through the packet transmitter/receiver based on the STP status stored in the STP information storage unit, in such a manner that in a case where the BPDU are transmitted from the logic port, the BPDU having a same root path cost and a same port priority are transmitted from all of the plurality of mesh-connecting ports related to the logic port; and
      a port status setting unit which sets all of the plurality of mesh-connecting ports related to the logic port to the same STP status as the logic port, based on the STP status which is stored in the STP information storage unit.

2. A mesh network bridge according to claim 1, wherein the shortest path constructing unit utilizes an optimized forwarding algorithm.

3. A mesh network bridge according to claim 2, further comprising a forwarding table storing a destination port for a packet to be transmitted,
   wherein the packet transmitter/receiver accesses the forwarding table through the shortest path constructing unit, and in a case where the destination port is known for the packet to be transmitted, outputs the packet to the destination port, and wherein the packet transmitter/receiver executes a predetermined flooding process based on the optimized forwarding algorithm in a case where the destination is unknown.

4. A mesh network bridge according to claim 1,
   wherein the shortest path constructing unit receives from the packet transmitter/receiver a packet to be transmitted externally, and performs an output process required to determine an optimum port for forwarding the packet.

5. A mesh network bridge according to claim 1, further comprising a non-mesh-connecting port,
   wherein the packet transmitter/receiver performs transmitting and receiving packets between other mesh network bridges connected to the non-mesh-connecting ports, nodes and non-mesh network bridges.

6. A mesh network bridge comprising a plurality of mesh-connecting ports for interconnecting a plurality of bridges including an own bridge and other bridges as a mesh network, comprising:
   a packet transmitter/receiver which reciprocally transmits and receives packets between the plurality of bridges through the plurality of mesh-connecting ports;

a shortest path constructing unit which constructs the shortest path between the plurality of bridges through the packet transmitter/receiver; and a backup processing unit which executes backup processing to activate a backup protocol for forming a backup route in such a manner that, with the shortest path constructed between the plurality of bridges by the shortest path constructing unit, a first mesh network bridge that has detected a line fault is continuously left in a mesh domain, and a second mesh network bridge rendered unreachable by a packet due to the line fault is reached by the packet through a third mesh network bridge connected to the second mesh network bridge;

wherein the backup processing unit comprises:

a backup candidate memory which stores information for identifying the plurality of mesh-connecting ports, information for identifying neighboring bridges connected to the plurality of mesh-connecting ports, and information for identifying bridges constituting backup candidates for the neighboring bridges, in association with each other;

a line fault detecting unit which detects a line fault between a first other bridge connected to the plurality of mesh-connecting ports;

a backup bridge selecting unit which selects, upon detection of a line fault by the line fault detecting unit, a second other bridge connected to the mesh network from the backup candidate memory in order to form a backup route by which data to be transmitted to the first other bridge reaches the first other bridge through the second other bridge;

a backup request sending unit which sends out, through the packet transmitter/receiver, a backup request packet containing information for identifying the first other bridge to the second other bridge selected by the backup bridge selecting unit, and at a same time requests, upon receipt of the data to be sent to the first other bridge, the second other bridge to form a first route for sending the data to the second other bridge;

a backup request receiving unit which issues, upon receipt of a backup request packet from a third other bridge as the second other bridge through the packet transmitter/receiver, a request to form a second route for sending out data from the third other bridge to the first other bridge as viewed from the third other bridge identified by identification information contained in the backup request packet; and a route control unit which causes the shortest path constructing unit to form a route corresponding to a selected one of the first route requested to form by the backup request sending unit and the second route requested to form by the backup request receiving unit;

wherein the shortest path constructing unit utilizes an optimized forwarding algorithm; and wherein the route control unit, upon receipt of a request from one of the backup request sending unit and the backup request receiving unit to form a backup route, requests the shortest path constructing unit to execute an exceptional process for the optimized forwarding to form the backup route, and upon receipt of a request to cancel the backup route, requests the shortest path constructing unit to stop the exceptional process for the backup route.

7. A mesh network bridge according to claim 6, wherein the shortest path constructing unit receives a packet to be transmitted outside from the packet transmitter/receiver and performs an output process for determining the optimum port for forwarding the packet.

8. A mesh network bridge according to claim 6, further comprising a forwarding table storing a destination port for a packet to be transmitted;

wherein the packet transmitter/receiver accesses the forwarding table through the shortest path constructing unit, and in a case where the destination port is known for the packet to be transmitted, outputs the packet to the destination port, and wherein the packet transmitter/receiver executes a predetermined flooding process based on the optimized forwarding algorithm in a case where the destination is unknown.

9. A mesh network bridge according to claim 6, further comprising a non-mesh-connecting port, wherein the packet transmitter/receiver performs transmitting and receiving packets between other mesh network bridges connected to the non-mesh-connecting ports, nodes and non-mesh network bridges.

10. A mesh network bridge according to claim 6, further comprising a backup candidate memory control unit, wherein a neighbor notification packet containing information on the other bridges connected to any one of the plurality of mesh-connecting ports of the own bridge is sent out to the packet transmitter/receiver, and upon receipt of the neighbor notification packet from the other bridges through the packet transmitter/receiver, a receiving port number, a source address and information on the neighboring bridge are retrieved and stored in the backup candidate memory.

11. A mesh network bridge according to claim 10, wherein the backup candidate memory control unit stores a remaining monitor time for detecting a line fault in the backup candidate memory, while regularly monitoring a remaining monitor time, and upon detection of a failure to send the neighbor notification packet for a predetermined period of time, notifies the line fault detecting unit that a line fault has occurred.

12. A mesh network bridge comprising a plurality of mesh-connecting ports for interconnecting a plurality of bridges including an own bridge and other bridges as a mesh network, comprising:

a packet transmitter/receiver which reciprocally transmits and receives packets between the plurality of bridges through the plurality of mesh-connecting ports;

a shortest path constructing unit which constructs the shortest path between the plurality of bridges through the packet transmitter/receiver; and a backup processing unit which executes backup processing to activate a backup protocol for forming a backup route in such a manner that, with the shortest path constructed between the plurality of bridges by the shortest path constructing unit, a first mesh network bridge that has detected a line fault is continuously left in a mesh domain, and a second mesh network bridge rendered unreachable by a packet due to the line fault is reached by the packet through a third mesh network bridge connected to the second mesh network bridge;

wherein the backup processing unit comprises:

a backup candidate memory which stores information for identifying the plurality of mesh-connecting ports, information for identifying neighboring bridges connected to the plurality of mesh-connecting ports, and information for identifying bridges constituting backup candidates for the neighboring bridges, in association with each other, a line fault detecting unit which detects a line fault between a first other bridge connected to the plurality of mesh-connecting ports;

a backup bridge selecting unit which selects, upon detection of a line fault by the line fault detecting unit, a second other bridge connected to the mesh network from the backup candidate memory in order to form a backup route by which data to be transmitted to the first other bridge reaches the first other bridge through the second other bridge;

a backup request sending unit which sends out, through the packet transmitter/receiver, a backup request packet containing information for identifying the first other bridge to the second other bridge selected by the backup bridge selecting unit, and at a same time requests, upon receipt of the data to be sent to the first other bridge, the second other bridge to form a first route for sending the data to the second other bridge;

a backup request receiving unit which issues, upon receipt of a backup request packet from a third other bridge as the second other bridge through the packet transmitter/receiver, a request to form a second route for sending out data from the third other bridge to the first other bridge as viewed from the third other bridge identified by identification information contained in the backup request packet; and a route control unit which causes the shortest path constructing unit to form a route corresponding to a selected one of the first route requested to form by the backup request sending unit and the second route requested to form by the backup request receiving unit;

wherein the mesh network bridge further comprises a backup receiving table, and wherein the backup request receiving unit, upon receipt of a backup request packet from the other bridges through the packet transmitter/receiver, (1) registers in the backup receiving table a connecting port that has received the packet, a backup target (unreachable bridge) and a backup source (requesting bridge) indicated by the packet and a remaining monitor time, (2) upon receipt of a packet having a backup target as a destination from the backup source, requests the route control unit to form a route for sending out the packet to the backup target, (3) in a case where a combination of the backup source and the backup target indicated by the backup request packet is already stored in the backup receiving table, sets the remaining monitor time to an initial value, and (4) regularly checks the remaining monitor time, and upon expiry of the remaining monitor time or upon receipt of a request from the packet transmitter/receiver to cancel the backup, deletes backup route items (the backup source, the backup target, and the remaining monitor time) from the backup receiving table while at the same time requesting the route control unit to block the backup route.

13. A mesh network bridge according to claim 12, wherein the shortest path constructing unit receives from the packet transmitter/receiver a packet to be transmitted externally, and performs an output process required to determine an optimum port for forwarding the packet.

14. A mesh network bridge according to claim 12, further comprising a forwarding table storing a destination port for a packet to be transmitted, wherein the packet transmitter/receiver accesses the forwarding table through the shortest path constructing unit, and in a case where the destination port for the packet to be transmitted is known, the packet transmitter/receiver outputs the packet to the destination port, and in a case where the destination is unknown, the packet transmitter/receiver executes a predetermined flooding process based on an optimized forwarding algorithm.

15. A mesh network bridge according to claim 12, which further comprises a non-mesh-connecting port, and wherein the packet transmitter/receiver performs transmitting and receiving packets between other mesh network bridges connected to the non-mesh connecting ports, nodes and non-mesh network bridges.

16. A mesh network bridge according to claim 12, further comprising a backup candidate memory control unit which transmits to the packet transmitter/receiver a neighbor notification packet containing information on the other bridges connected to any of the plurality of mesh-connecting ports of the own bridge, and upon receipt of the neighbor notification packet from the other bridges through the packet transmitter/receiver, retrieves a receiving port number, a source address and information on the neighboring bridge, and then stores the retrieved receiving part number, the source address and the information on the neighboring bridge in the backup candidate memory.

17. A mesh network bridge according to claim 16, wherein the backup candidate memory control unit stores a remaining monitor time for detecting a line fault in the backup candidate memory, while regularly monitoring the remaining monitor time, and upon detection of the failure to send the neighbor notification packet for a predetermined period of time, notifies the line fault detecting unit that a line fault has occurred.

18. A mesh network bridge comprising a plurality of mesh-connecting ports for interconnecting a plurality of bridges including an own bridge and other bridges as a mesh network, comprising:

a packet transmitter/receiver which reciprocally transmits and receives packets between the plurality of bridges through the plurality of mesh-connecting ports;

a shortest path constructing unit which constructs the shortest path between the plurality of bridges through the packet transmitter/receiver; and a backup processing unit which executes backup processing to activate a backup protocol for forming a backup route in such a manner that, with the shortest path constructed between the plurality of bridges by the shortest path constructing unit, a first mesh network bridge that has detected a line fault is continuously left in a mesh domain, and a second mesh network bridge rendered unreachable by a packet due to the line fault is reached by the packet through a third mesh network bridge connected to the second mesh network bridge;

wherein the backup processing unit comprises:

a backup candidate memory which stores information for identifying the plurality of mesh-connecting ports, information for identifying neighboring bridges connected to the plurality of mesh-connecting ports, and information for identifying bridges constituting backup candidates for the neighboring bridges, in association with each other, a line fault detecting unit which detects a line fault between a first other bridge connected to the plurality of mesh-connecting ports;

a backup bridge selecting unit which selects, upon detection of a line fault by the line fault detecting unit, a second other bridge connected to the mesh network from the backup candidate memory in order to form a backup route by which data to be transmitted to the first other bridge reaches the first other bridge through the second other bridge;

a backup request sending unit which sends out, through the packet transmitter/receiver, a backup request packet containing information for identifying the first other bridge to the second other bridge selected by the backup bridge selecting unit, and at a same time requests, upon receipt of the data to be sent to the first other bridge, the second other bridge to form a first route for sending the data to the second other bridge;

a backup request receiving unit which issues, upon receipt of a backup request packet from a third other bridge as the second other bridge through the packet transmitter/receiver, a request to form a second route for sending out data from the third other bridge to the first other bridge as viewed from the third other bridge identified by identification information contained in the backup request packet; and a route control unit which causes the shortest path constructing unit to form a route corresponding to a selected one of the first route requested to form by the backup request sending unit and the second route requested to form by the backup request receiving unit;

wherein the backup bridge selecting unit, upon receipt of a notified port number associated with a line fault from the line fault detecting unit and in a case where the port is one of the plurality of mesh-connecting ports, finds a neighboring bridge (unreachable bridge) connected to a port of the notified port number from the backup candidate memory, selects, as a requestee bridge, a neighboring bridge having the unreachable bridge as a backup candidate, notifies the backup request sending unit, and in order to indicate occurrence of the line fault to a connected port notified of the line fault, rewrites a remaining time of the connecting port of the backup candidate memory to zero.

19. The mesh network bridge according to claim 18, wherein the shortest path constructing unit receives from the packet transmitter/receiver a packet to be transmitted externally, and performs an output process required to determine an optimum port for forwarding the packet.

20. A mesh network bridge according to claim 18, which further comprises a forwarding table storing a destination port for a packet to be transmitted, wherein the packet transmitter/receiver accesses the forwarding table through the shortest path constructing unit, and in a case where the destination port for the packet to be transmitted is known, the packet transmitter/receiver outputs the packet to the destination port, and in a case where the destination is unknown, the packet transmitter/receiver executes a predetermined flooding process based on an optimized forwarding algorithm.

21. A mesh network bridge according to claim 18, which further comprises a non-mesh-connecting port, and wherein the packet transmitter/receiver performs transmitting and receiving packets between other mesh network bridges connected to the non-mesh connecting ports, nodes and non-mesh network bridges.

22. A mesh network bridge according to claim 18, further comprising a backup candidate memory control unit which transmits to the packet transmitter/receiver a neighbor notification packet containing information on the other bridges connected to any of the plurality of mesh-connecting ports of the own bridge, and upon receipt of the neighbor notification packet from the other bridges through the packet transmitter/receiver, retrieves a receiving port number, a source address and information on the neighboring bridge, and then stores the retrieved receiving port number, the source address and the information on the neighboring bridge in the backup candidate memory.

23. A mesh network bridge according to claim 22, wherein the backup candidate memory control unit stores a remaining monitor time for detecting a line fault in the backup candidate memory, while regularly monitoring the remaining monitor time, and upon detection of the failure to send the neighbor notification packet for a predetermined period of time, notifies the line fault detecting unit that a line fault has occurred.

24. A mesh network bridge having a plurality of mesh-connecting ports to connect a plurality of bridges including an own bridge and other bridges as a mesh network, comprising:

a packet transmitter/receiver which reciprocally transmits and receives packets between the plurality of bridges through the plurality of mesh-connecting ports;

a shortest path constructing unit which constructs the shortest path between the plurality of bridges through the packet transmitter/receiver;

a STP processing unit which executes STP processing to activate a spanning tree protocol (STP) for attaching redundancy to the mesh network with the shortest path constructed between the plurality of bridges by the shortest path constructing unit; and a backup processing unit which executes a backup process to activate a backup protocol for forming a backup route in such a manner that, with the shortest path constructed between the plurality of bridges by the shortest path constructing unit, a first mesh network bridge that has detected a line fault is continuously left in a mesh domain, and a second mesh network bridge rendered unreachable by a packet due to the line fault is reached the packet through a third mesh network bridge connected to the second mesh network bridge;

wherein the STP processing unit comprises:

a logic port storage unit which stores the plurality of mesh-connecting ports, and at least one logic port related to the plurality of mesh-connecting ports;

a rereading unit which receives configuration bridge protocol data units (BPDU) of the other bridges from any one of the plurality of mesh-connecting ports through the packet transmitter/receiver, and rereads the BPDU as having been received from the logic port stored in the logic port storage unit;

a BPDU receiving unit which receives the BPDU reread by the rereading unit as having been received from the logic port;

a STP information management unit which determines an STP status of the logic port based on the BPDU received by the BPDU receiving unit;

a STP information storage unit which receives and stores information on the STP status determined by the STP information management unit;

a BPDU transmitting unit which transmits the BPDU to the other bridges through the packet transmitter/receiver based on the STP status stored in the STP information storage unit, and sends the BPDU having a same root path cost and a same port priority from all of the plurality of mesh-connecting ports related to the logic port; and a port status setting unit which sets all of the plurality of mesh-connecting ports related to the logic port to the same STP status as the logic port, based on the STP status stored in the STP information storage unit.

25. A mesh network bridge according to claim 24, wherein the backup processing unit comprises:

a backup candidate memory which stores, in a related manner, information for identifying the plurality of mesh-connecting ports, information for identifying neighboring bridges connected to the plurality of mesh-connecting ports, and information for identifying bridges constituting candidates for the neighboring bridges;

a line fault detecting unit which detects a line fault between a first other bridge connected to the plurality of mesh-connecting ports;

a backup bridge selecting unit which selects, upon detection of a line fault by the line fault detecting unit, a second other bridge connected to the mesh network from the backup candidate memory in order to form a backup route by which data to be transmitted to the first other bridge reaches the first other bridge through the second other bridge;

a backup request sending unit which sends out, through the packet transmitter/receiver, a backup request packet containing information for identifying the first other bridge to the second other bridge selected by the backup bridge selecting unit, and at a same time requests, upon receipt of the data to be sent to the first other bridge, the second other bridge to form a first route for sending the data to the second other bridge;

a backup request receiving unit which issues, upon receipt of a backup request packet from a third other bridge as the second other bridge through the packet transmitter/receiver, a request to form a second route for sending out data from the third other bridge to the first other bridge as viewed from the third other bridge identified by identification information contained in the backup request packet; and a route control unit which causes the shortest path constructing unit to form a route corresponding to a selected one of the first route requested to form by the backup request sending unit and the second route requested to form by the backup request receiving unit.

* * * * *